United States Patent [19]

Laliotis

[11] 4,152,767
[45] May 1, 1979

[54] METHOD AND APPARATUS FOR MEASURING DIMENSIONS

[75] Inventor: Theodore A. Laliotis, Los Altos, Calif.

[73] Assignee: Atmospheric Sciences, Inc., Sunnyvale, Calif.

[21] Appl. No.: 727,042

[22] Filed: Sep. 27, 1976

[51] Int. Cl.² .............................................. G01B 11/10
[52] U.S. Cl. .................................... 364/560; 356/386; 356/394; 250/560
[58] Field of Search ............ 235/151.3, 151.33, 151.32; 250/560, 223 R, 561; 356/108, 157, 160, 156, 158, 161, 168, 163, 164; 358/107

[56] References Cited

U.S. PATENT DOCUMENTS

| | | | |
|---|---|---|---|
| 3,513,321 | 5/1970 | Sherman | 356/160 X |
| 3,588,480 | 6/1971 | Unger et al. | 235/151.3 |
| 3,724,958 | 4/1973 | Callan | 356/160 |
| 3,737,856 | 6/1973 | Lehrer et al. | 250/560 X |
| 3,787,700 | 1/1974 | Chasson | 250/560 |
| 3,806,253 | 4/1974 | Denton | 250/560 X |
| 3,897,156 | 7/1975 | Chasson | 250/560 |

Primary Examiner—Edward J. Wise
Attorney, Agent, or Firm—Alan H. MacPherson

[57] ABSTRACT

An array of photosensitive imaging sensors connected to a digital computer is utilized to measure selected dimensions of objects upon which the photosensitive array is focused. Two sets of information in the form of analog signals generated by the photosensitive array, both with and without an object in view, are converted to digital form and stored in a memory. The two sets of information contained in the memory are compared to thereby create digital signals indicative of the dimensions of the object. These digital signals are converted to dimensional form and displayed.

15 Claims, 46 Drawing Figures

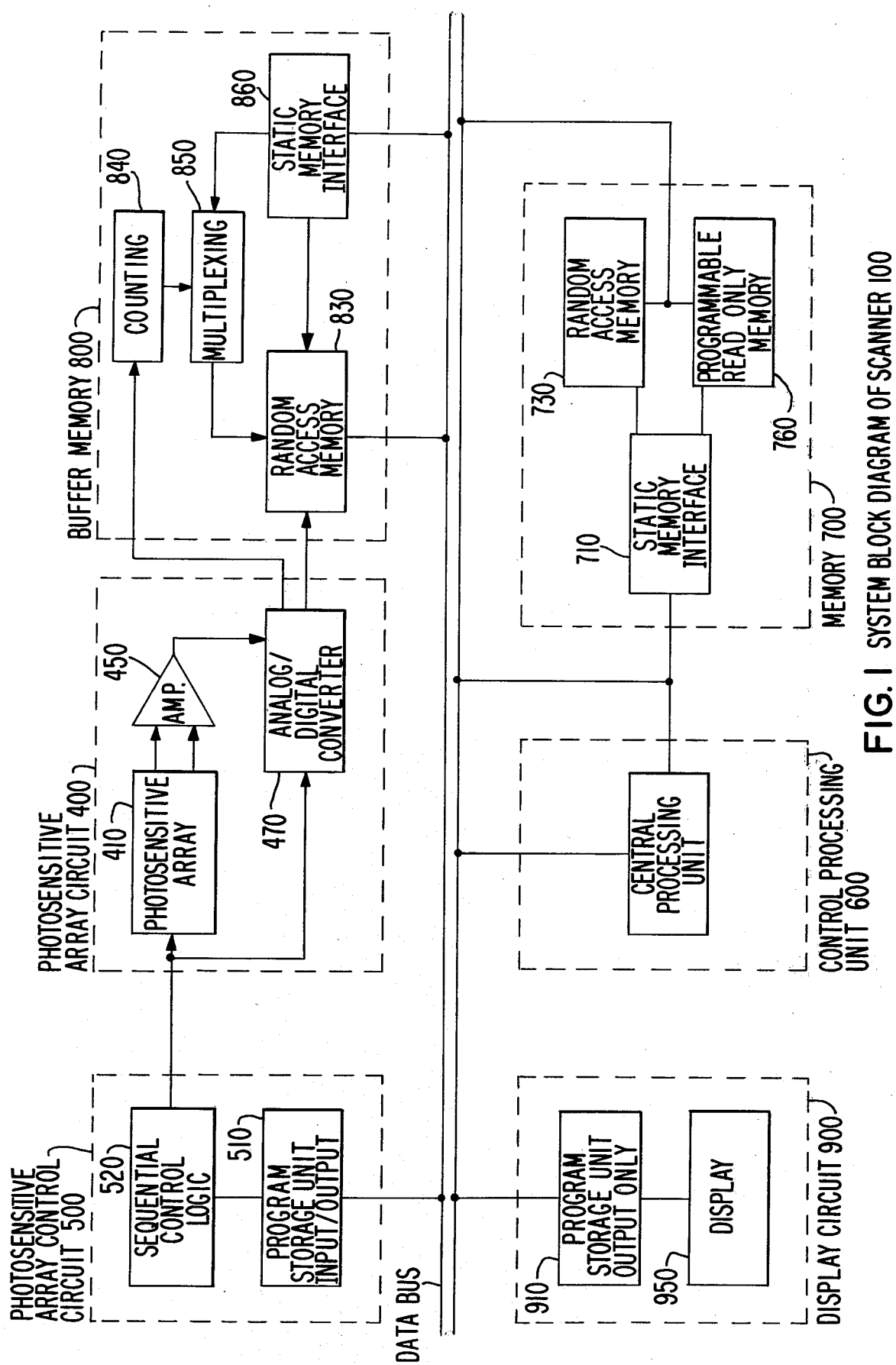
FIG. 1 SYSTEM BLOCK DIAGRAM OF SCANNER 100

| CASE 1 | | | | | | |
|---|---|---|---|---|---|---|
| TIMED CHARGE | A | B | C | D | E | FIG. 3C |
| CONVERSION | | A | B | C | D | FIG. 3D |
| PROCESSING | | | A | B | C | FIG. 3E |
| UNTIMED CHARGE | | | | | | FIG. 3F |

| CASE 2 | | | | | |
|---|---|---|---|---|---|
| TIMED CHARGE | A | B | C | D | FIG. 3G |
| CONVERSION | | A | B | C | FIG. 3H |
| PROCESSING | | | A | B | FIG. 3I |
| UNTIMED CHARGE | | | | | FIG. 3J |

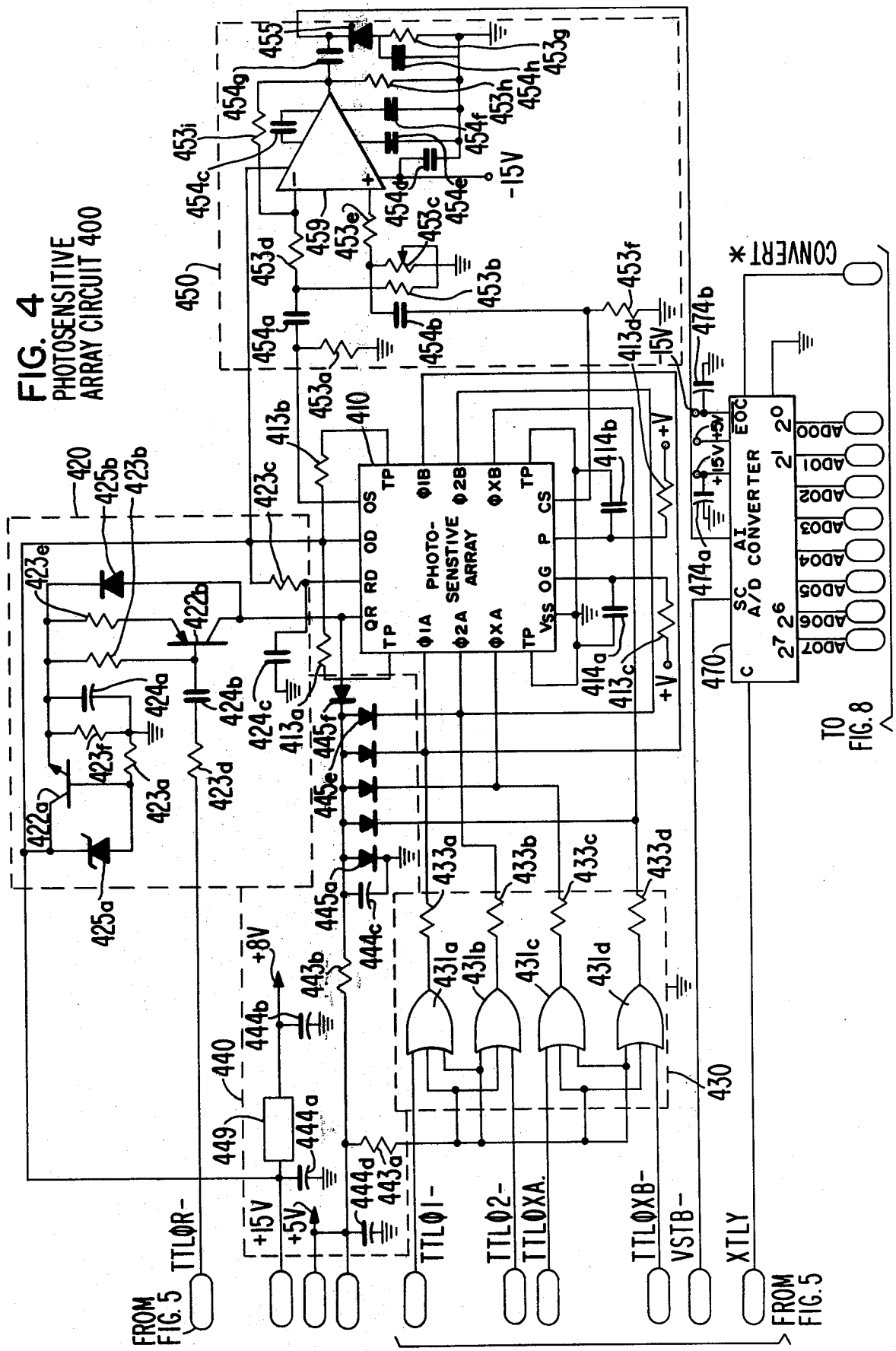

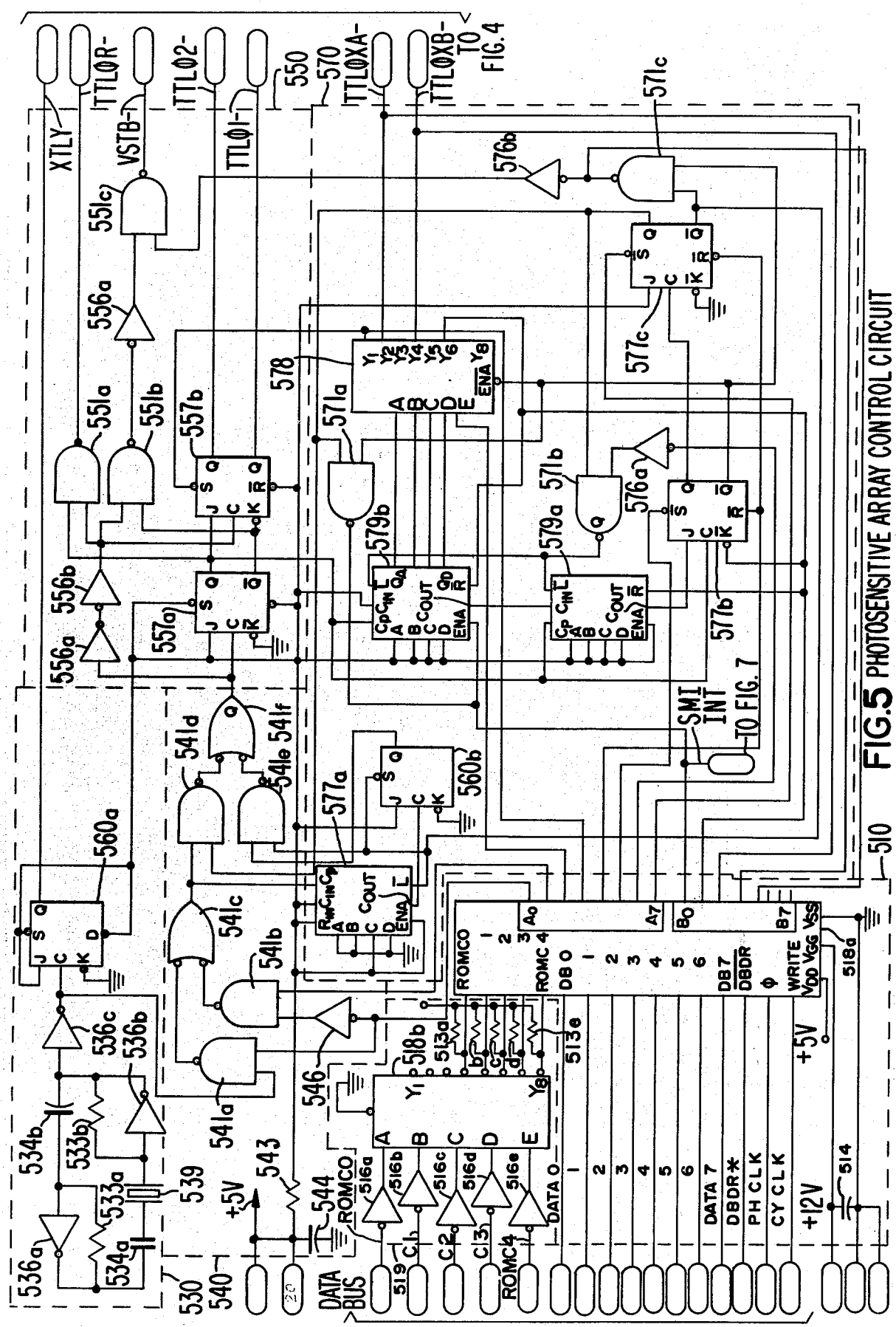
FIG.5 PHOTOSENSITIVE ARRAY CONTROL CIRCUIT

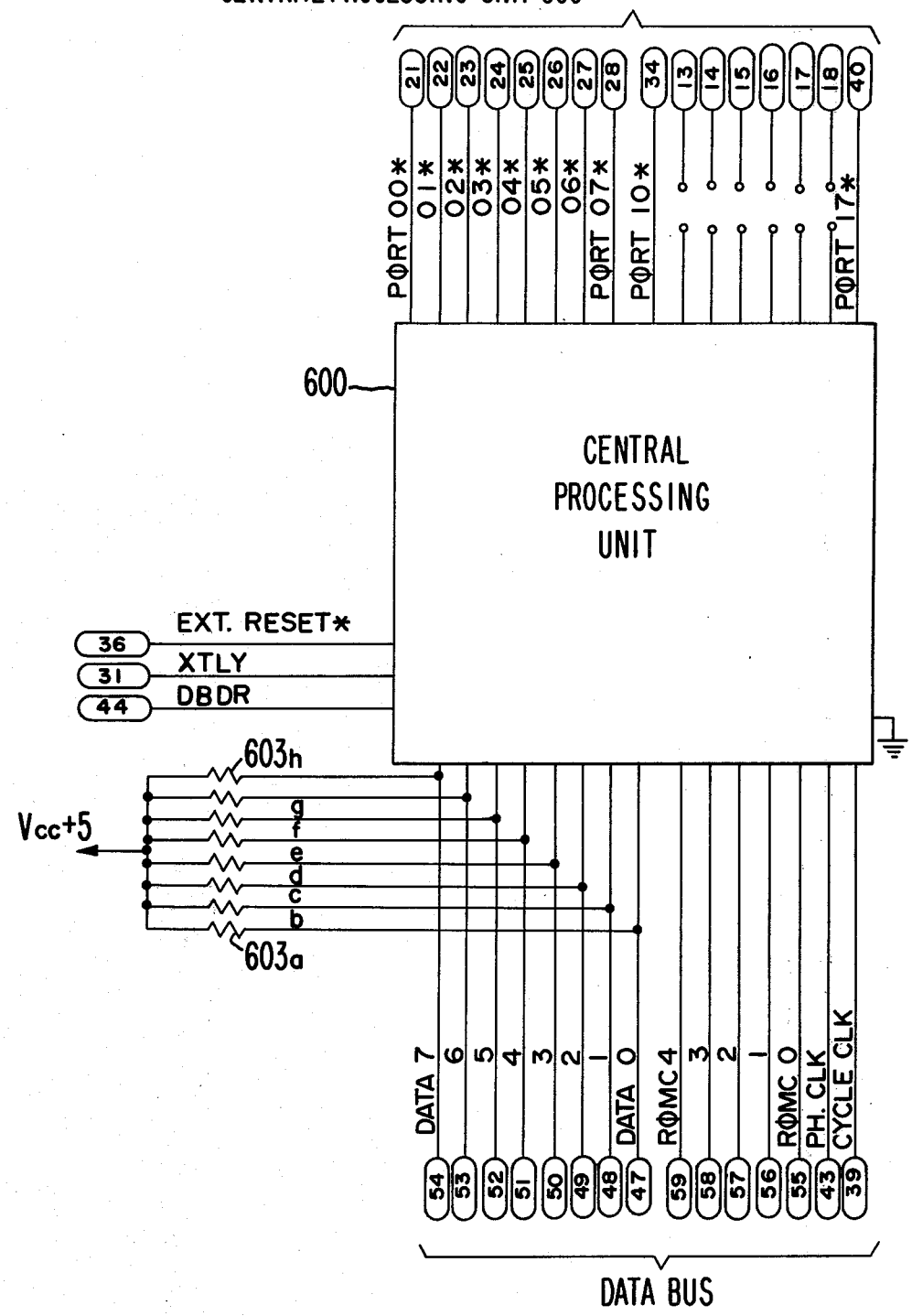

MEMORY 700

FIG. 8 BUFFER MEMORY 800

DISPLAY CIRCUIT 900

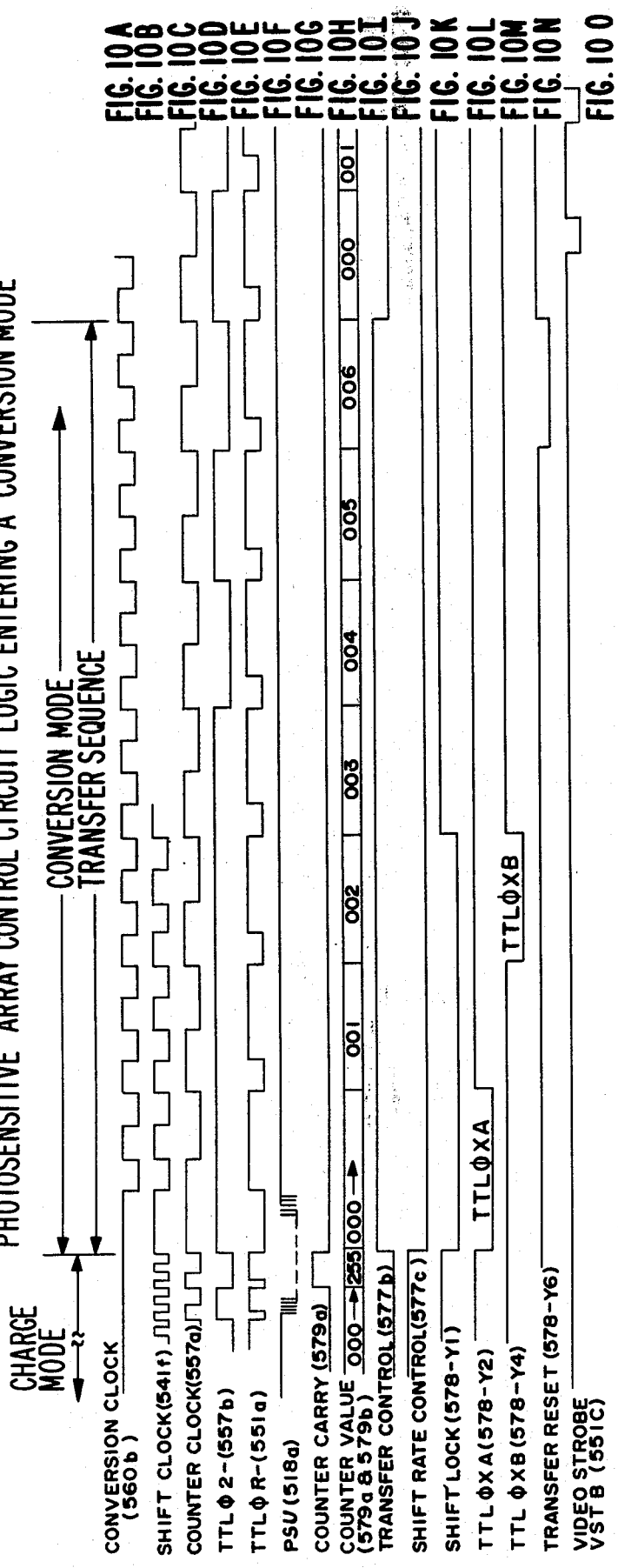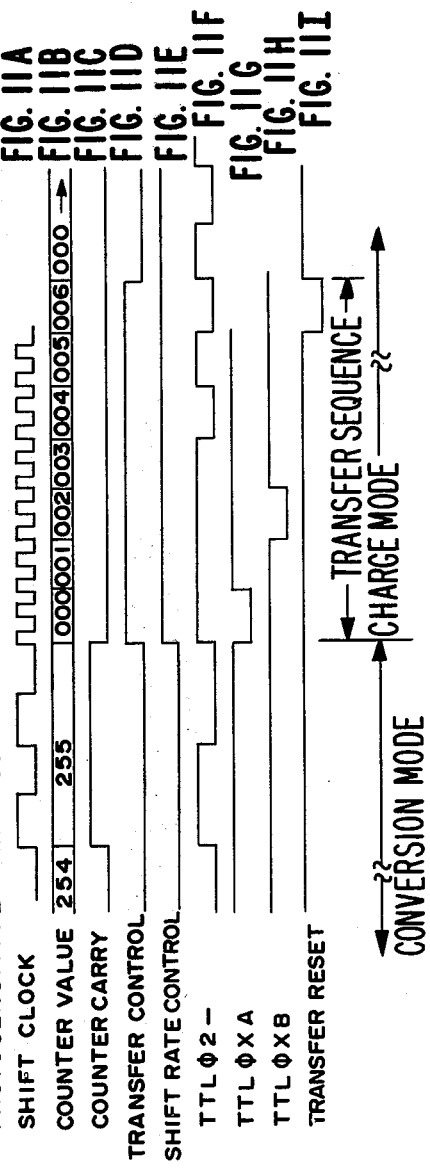

CHIP SELECT
DECODER 720
PROM MAP

METHOD AND APPARATUS FOR MEASURING DIMENSIONS

BACKGROUND OF THE INVENTION

1. Field of the Invention

This invention relates to measuring systems and, in particular, to a measuring system which automatically provides measurements of selected dimensions of a wide variety of objects.

2. Prior Art

The measurement of dimensions of objects is of importance in a wide variety of fields. For example, in steel mills the lengths of steel slabs must be measured. On highways, the length of trucks must be measured to insure compliance with the motor vehicle laws. Freight haulers measure the volume of freight, as well as its weight, to calculate shipping charges. In lumber mills accurate measurements of log dimensions are necessary to select the most efficient cutting pattern for each log.

Various techniques have been proposed to measure the dimensions of objects automatically. In one system, mirrors rotate at a uniform rate and reflect light to a sensor from the object whose length is being measured. The number of light pulses generated by the sensor, together with the rotational rate of the mirror and the velocity of the object, uniquely determine the length of the object. The rotating parts, however, require frequent maintenance and adjustment.

Other automatic dimension measuring apparatus have been the subject of several patents. See, e.g., U.S. Pat. No. 3,897,156 entitled "Structure for Measuring the Average Diameter of an Approximately Circular Cross-Section of an Object," by Leon H. Chasson and assigned to Atmospheric Sciences, Inc., and U.S. Pat. No. 3,787,700 entitled "Automatic System for Measuring Selected Dimensions," also invented by Chasson and assigned to Atmospheric Sciences, Inc., the assignee of the invention which is the subject of this application. Also U.S. Pat. No. 3,806,253 entitled "Sweep Measuring Scheme" issued on an application of Denton and assigned to Weyerhaeuser Company, discloses a method of determining the sweep of a log.

SUMMARY OF THE INVENTION

This invention offers several advantages over prior art systems by utilizing a photosensitive array in such a manner as to eliminate several components formerly incorporated in systems used to measure selected dimensions of objects suitably disposed in front of an array or other apparatus. Although as with certain prior art systems, the system of this invention is substantially all electronic, this invention provides a self-contained automatic measuring system substantially smaller than prior art systems. In a significant departure from prior art systems, the system of this invention automatically compensates for ambient lighting conditions, and thus may be quickly and conveniently situated in many locations, and operated in a wide variety of lighting conditions.

According to this invention, a photosensitive array, typically comprising a charge coupled device image sensor containing a plurality of light sensing elements, is positioned to sense lighting conditions in relation to a path along which objects travel. The analog output signals generated by the photosensitive array, both with and without an object disposed in front of it, are converted to digital form, and stored in a memory. A central processing unit compares the set of digital signals representative of the view of the array with an object present to the set of signals representative of the view without an object present to derive a set of signals representative of the dimensions of the object in the view of the array. In one embodiment a third set of digital signals is also stored in the memory. This set of digital signals is indicative of the noise level (often called "dark current") present within the photosensitive array. This noise level is typically a function of temperature. The dark current signals may be utilized by the central processing unit to further refine the accuracy of the measurement of the dimensions of the object.

Placing an object before the photosensitive array influences the output signals of the photosensitive array in a manner related to the dimensions of the object. These analog signals from the photosensitive array are converted to digital form and stored in a buffer memory. Typically, the buffer memory is a random access memory having n storage locations or "bytes," each of k bits, where n at least equals the number of sensing elements of the photosensitive array, and k is typically, although not necessarily, eight.

Digital signals temporarily stored in the buffer memory are supplied to a central processing unit (CPU) and memory. The memory typically includes a programmable read only memory (PROM) which controls the central processing unit and a random access memory (RAM) for storing several sets of digital signals. One set of n bytes may be a stored digital signal representative of the dark current of the photosensitive array. Another set of digital signals, also of n bytes, is representative of the area viewed by the array without an object present. Still another set of digital signals, again of n bytes, indicative of the present view of the photosensitive array, either with or without an object present, is also stored in the random access memory. Depending upon a variety of factors, the dark current measurement may, if desired, be omitted.

By utilizing any one of numerous algorithms and the information stored in the random access memory, the central processing unit can detect the presence of the object being measured. In one embodiment this is accomplished by comparing the digital signals representative of the view of the array without an object present with the digital signals representative of the view of the array with an object present, and ascertaining if a preselected difference between the two sets of signals exists. Having detected the presence of the object, the central processing unit then proceeds to calculate the selected dimensions of the object and display them. The central processing unit may be used to continuously calculate selected dimensions of an object passing before the photosensitive array. For example, in one embodiment, the invention is capable of measuring the diameter of a log at locations situated one inch apart along the length of the log, as these locations pass in front of the photosensitive array at a velocity of up to 400 feet per minute. In one embodiment the invention is capable of resolving dimensions to tolerances of less than 0.5 millimeters.

In timber related operations, the invention is useful for log sorting, bucking, breakdown, scaling, sweep detection, edging, and other operations. It is also useful in controlling veneer lathes, peeler blocks, and in the sorting of lumber. This invention is also useful in measuring the dimensions of objects other than logs, such as metal products or any other object capable of being distinguished from the background.

While the operation of this invention will be described in terms of detecting the presence of an object by comparing the field of view of the scanner with an object present to the field of view of the scanner without an object present, it should be understood that this invention can also detect the disappearance of an object from the field of view. Basically, the field of view which the invention utilizes as a basis of comparison with subsequent fields of view, and which is referred to herein as the "background field of view" or "background" can be defined by the invention to either include or exclude an object. If the background includes the object, then upon removal of the object from the background, the invention indicates both the absence of the object and selected dimensions of the absent object. To avoid confusion as to whether the background includes or excludes an object, the dimensions of which are being measured, the invention includes means for controlling the measurement of the background to ensure that the background, when defined, is in a desired state (i.e., either includes or excludes an object). In one embodiment the means for controlling the measurement of the background comprises a plurality of marker sensors and corresponding light sources arranged to detect the presence or absence of the object. Signals from the marker sensors are used to control the times during which the scanner of this invention measures the background. In certain applications where this invention is used to measure selected dimensions of objects, the background will be measured during the absence of any object. In applications such as security surveillance, the background will often include numerous objects the absence of any of which is to be detected. In either case, the presence of additional objects in the field of view of the scanner can be detected, and usually selected dimensions of these objects can be measured by the invention.

This invention provides numerous substantial advantages over the prior art. Because the scanner of this invention can utilize only ambient lighting, no special or critical lighting requirements are necessary, although special lighting can be used either alone or in combination with ambient lighting. Therefore, the invention may be used inside a building, or outside a building in any type of weather. The scanner can be programmed to automatically adjust, as necessary, to changing ambient lighting and temperature conditions. A variety of ambient light levels can be selected depending upon the reflectivity of objects the dimensions of which are being measured, and the reflectivity of the background.

DESCRIPTION OF THE DRAWINGS

FIG. 1 is a schematic drawing of one embodiment of the system of this invention.

FIGS. 3C through 3J schematically depict operational modes of one embodiment of this invention.

FIG. 4 is a schematic diagram of photosensitive array circuit 400 of FIG. 1.

FIG. 5 is a schematic diagram of photosensitive array control circuit 500 of FIG. 1.

FIG. 6 is a schematic diagram of central processing unit 600 of FIG. 1.

FIGS. 10A through 10O are diagrams depicting the interrelationship of the various signals illustrating operation of this invention during the transition from the "charge" mode to the "conversion" mode.

FIGS. 11A through 11I are additional diagrams illustrating the operation of the photosensitive array control circuit logic during the transition from the conversion mode to the charge mode.

DETAILED DESCRIPTION

A. General System Operation

Figure 2A:
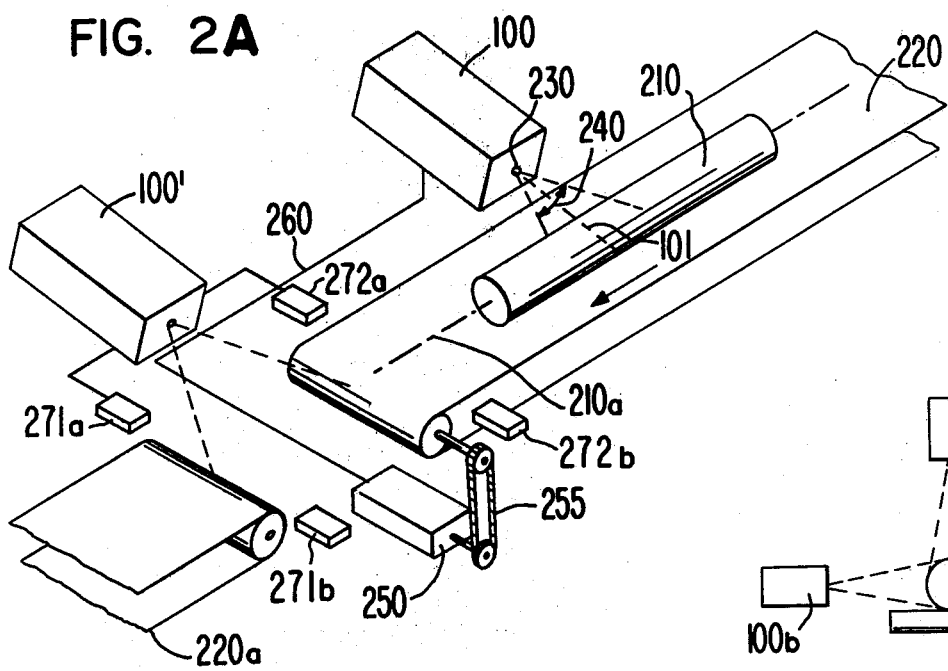
FIGS. 2A and 2B depict an embodiment of this invention as utilized to measure logs.

In explaining the structure and method of operation of this invention, reference will be made to an embodiment of this invention used to measure selected dimensions of logs. The description of this embodiment is not to be interpreted as limiting the invention to the use described.

A block diagram of the structure of this invention is depicted in FIG. 1. The manner of operation of this structure will now be described.

According to this invention, a photosensitive array 410 of n elements scans a desired region of space in response to signals received from sequential control logic 520. The photosensitive array 410 typically comprises a sequence of n photosensitive elements. For example, in one embodiment found particularly useful in measuring the diameters and other dimensions of logs, the array is a single line of 256 elements (often called a "linear array"), such as the CCD 110 produced by Fairchild. In other embodiments, suitable for this and other applications, two dimensional arrays (often called "area arrays"), for example, 100 elements by 100 elements (such as the CCD 201 area array produced by Fairchild Camera and Instrument Corporation, hereinafter "Fairchild",) will be more suitable.

Each of the n photosensitive elements, each typically comprising a charge storage element of a charge coupled device (hereinafter referred to as "CCD"), in photosensitive array 410 will accumulate a charge representative of the integral of the light incident upon it over a selected time period from a segment of space upon which that particular element of photosensitive array 410 is focused. The analog output signal from each element of photosensitive array 410 will have an amplitude proportional to the integral of the light incident upon that element of photosensitive array 410. Because at any instant the light striking photosensitive array 410 is related to the dimensions of objects in the field of view of photosensitive array 410, the pattern of charge packets from all the light sensing elements of photosensitive array 410 will be related to certain dimensions of whatever objects are focused upon photosensitive array 410.

The photosensitive array control circuit 500 (containing sequential control logic 520 and program storage unit 510) controls photosensitive array 410 and provides, for example, signals to control the rate and disposition of output signals from the photosensitive array 410.

The charge packets within the n elements of photosensitive array 410 are used to generate n analog signals which are supplied sequentially to operational amplifier circuit 450, where the analog signals are amplified. The resulting amplified analog signals are then serially supplied to analog to digital converter 470 for conversion to digital form. The output signals from analog to digital converter 470 are a series of n digital signals (of binary form) each digital signal comprising a byte of k bits (where k is a selected integer such as eight (8)), the value of each byte being proportional to the integral of the light incident upon that particular element of photosensitive array 410 from which that byte was derived over whatever time period was selected.

One method of generating the appropriate time period for integration of the light within photosensitive array 410 comprises controlling central processing unit 600 to allow the ambient light to cause accumulation of charge within the elements of the photosensitive array 410 over changing (such as increasingly longer or shorter) time periods until the output signals from analog to digital converter 470 reach predetermined values. In this manner scanner 100 can adapt itself to varying ambient light levels. Alternatively a separate, suitable focused light sensitive element, for example, a photodiode, can be used to sense ambient light and to produce an output signal which is used to determine a suitable time period for accumulation of charge within the photosensitive array 410.

Another method of generating an appropriate integration time is to program CPU 600 to allow array 410 to perform a first charge integration for a predetermined period within an allowable time range, e.g., for 32 milliseconds in a range of 4 to 64 milliseconds. If a 5-volt average signal per element over the total number of elements of photosensitive array 410 is not supplied from A/D converter (as determined by CPU 600 analyzing the digital output signals from A/D converter 470 stored in RAM 830) then a longer (if the average signal is less than 5-volts) or shorter (if the average signal is more than 5-volts) period of integration is selected. This iterative process continues until a signal of five (5) volts plus or minus a selected tolerance is obtained. If such a signal can be obtained, CPU 600 supplies a signal so indicating. This signal may, for example, illuminate a portion of display circuit 900 thereby notifying the user of scanner 100 that a suitable background reading has been made and measurements may begin.

If a 5-volt average signal cannot be obtained even with integration time at either the longest or shortest period in the allowable range of integration times then the CPU 600 is programmed to repeat the iterative process with a different "target" voltage, for example 2.5 volts. Depending upon the target voltage actually achieved, CPU 600 will illuminate a selected portion of display circuit 900 to notify the user that the ambient light conditions are sufficient (i.e., the desired average signal can be achieved), marginal (i.e., the minimum or maximum average signal corresponding to a marginally dim or marginally bright ambient can be achieved), or insufficient (either too dim or too bright).

According to another method for selecting the integration time, one or more switches may be added to scanner 100 to allow manual selection of the integration time. In this manner the integration time can be selected to optimize the sensitivity of the system to objects of given reflectivity or a range of reflectivities. For example, the integration time can be selected to result in the largest difference in output signal level between the background reading and the average object reading or to maximize the probability of detecting the presence of an object selected from a population of objects having a given statistical distribution of reflectivities.

The series of n digital signals from analog to digital converter 470 are then supplied to the random access memory 830 of buffer memory 800. As each of the n bytes is supplied to random access memory 830 another signal is supplied from A/D converter 470 to counting circuit 840, which generates a unique address to define the location in memory 830 at which the corresponding byte of data from converter 470 is stored. Multiplexing circuit 850 transmits the address to memory 830. The particular address supplied to memory 830 is controlled by an address-select signal generated by a flip-flop contained within counting circuit 840. Thus the address supplied to memory 830 is generated either by counting circuit 840 or supplied by control processing unit 600 through static memory interface 860.

The contents of buffer memory 800 are then supplied to the central processing unit 600 and memory 700. The operation of central processing unit 600 is controlled by a programmable read only memory 760 which contains instructions for the CPU 600. Included within memory 700 is a random access memory 730, which will typically store two or three sets of digital data of n bytes each, depending upon whether dark current signals are desired. If so, the first set of n bytes will be a dark current correction which is a characteristic of photosensitive array 410 and the ambient temperature. A background reading, representative of the view of photosensitive array 410 when no object is being measured, will be stored as a second set of n bytes. This second set of data will be referred to as the background reading, and corresponds, for example, in the use of this invention in a lumber mill, to a view of an empty conveyor belt passing in front of the photosensitive array 410. This set of data also may be useful to provide a comparison with any "present" view for ascertaining whether an object is passing in front of the photosensitive array 410.

The third set of data stored in RAM 730 corresponds to the present view of the photosensitive array 410. The present view of the photosensitive array 410 may include an object not present in the background view, in which event the signals from photosensitive array 410 will be different from the background reading. Finally, remaining portions of random access memory 730 will be used by central processing unit 600 to store intermediate results of calculations.

Utilizing the instructions (which may include look-up tables) from the programmable read only memory 760 (hereinafter sometimes referred to as "PROM 760") and the data stored in random access memory 730, the central processing unit 600 will perform calculations as specified by PROM 760. Typically, CPU 600 will correct the data indicative of the present view of the photosensitive array 410 by the data representative of the dark current and the data representative of the background view. The resulting digital signals will indicate the presence or absence of the object and will be related to the size of the object. These digital signals will be converted to dimensional information utilizing tables stored in PROM 760. The dimensional information is then transferred to display circuit 900, where it may be presented in any desired manner, for example, by light emitting diode display or by a printer. In addition, the information may be supplied to other equipment or computers or remote displays for further use, for example, to control automatic machine tools or update inventory records or to make an operator at a remote location aware of the dimensions of the object being measured. As will be seen, the operator can also operate the scanner manually to display, as long as he desires, the readout of the scanner at a selected time.

B. Object—Scanner Relationship

A schematic diagram of one possible relationship between one embodiment of the apparatus of this invention (hereinafter referred to as "smart scanner 100" or "scanner 100"), and an object being measured is depicted in FIG. 2A. In FIG. 2A a log 210 is shown on conveyor belt 220. Scanner 100 is shown positioned at substantially a right angle to the longitudinal axis 210a of log 210.

As log 210 passes into view of scanner 100, light reflected from log 210 is focused upon the photosensitive array 410 contained within scanner 100 by a lens of well-known construction having a lens axis or centerline 101 as shown. Axis 101 is perpendicular to array 410. A suitable lens will be obvious to one skilled in the measuring arts and thus this lens will not be described in detail.

The longitudinal axis 210a of log 210 is defined as the series of centers, or centroids of area, of the infinite number of cross sections of log 210. Thus the longitudinal axis 210a need not, and typically will not, be a straight line. If the longitudinal axis 210a is curved in only a single plane, that is, in only two dimensions, an error will be introduced into the measurements made by scanner 100 unless the scanner 100 is placed so that the axis 101 of the lens is perpendicular to the plane of curvature of the longitudinal axis 210a. Thus in applications of scanner 100 to logging operations involving substantially straight logs or logs curved in only two dimensions it will be advantageous to place the scanner 100 so that lens axis 101 is perpendicular to the surface upon which the log is resting or being moved; for example, scanner 100 would be placed directly over and looking down on conveyor belt 220. The problem of measuring a log having a longitudinal axis 210a which is curved in three dimensions is discussed below in conjunction with FIG. 2B.

The pattern of the incident light on array 410 will be related to the dimensions of the log 210. In FIG. 2A the diameter of log 210 appears to scanner 100 as occupying angle 240. The view of each element of array 410 may be converted to digital format and stored as previously discussed. By counting the number of elements of array 410 from which a significantly different digital value is obtained, as compared to that element's background reading, and then utilizing a look-up table relating log diameters to the number of significantly different elements of array 410, the diameter of the log can be displayed to the user of scanner 100.

One technique for controlling scanner 100 so that a background reading is taken at the desired time, for example, without a log present, is also shown in FIG. 2A. In this system a pair of "marker sensors" comprises, for example, two light sources 271b and 272b and two photosensitive elements 271a and 272a. The sources 271b and 272b and elements 271a and 272a are well known in the art and in one embodiment are as described in the above-cited Chasson patents. In operation elements 271a and 272a are connected to scanner 100, and continually relay signals to scanner 100 to provide an indication of whether any object is disposed on belts 220 and 220a in front of scanner 100. If no object is present, as indicated by marker sensors 271 and 272 then scanner 100 stores the reading from photosensitive array 410 as "background."

Also depicted in FIG. 2A is a technique which may be utilized to eliminate the conveyor 220 or other supporting means from the background view of scanner 100'. By providing a gap in conveyor 220, for example, as shown between conveyors 220 and 220a, or an opening in other supporting means for log 210, the view of scanner 100' of log 210 may be compared with a background which contains few or no objects. Additionally the gap facilitates more accurate measurements of logs by eliminating discolorations on the moving conveyor which interfere with measurements, and by allowing bark, chips, snow, or other debris which might introduce errors in measurements to fall from conveyor 220 before passing before scanner 100.

To measure the length of log 210, the previously described system and a sensor to measure the velocity of the log 210 may be used. In one embodiment the velocity sensor is a digital speed sensor 250 of a type well-known to those who design sawmill equipment, although other types of sensors known to the art, such as light sensitive marker sensors and corresponding light sources, can be used. As described above, scanner 100' is situated so that light from a region between two sections of the conveyor is focused upon array 410 within scanner 100'.

As soon as the first end of log 210 moves into the field of view of array 410, a significantly different light pattern is sensed by scanner 100. The "significantly different pattern" may be defined by any appropriate algorithm; for example, by the existence of a pre-selected difference of thirty counts between the prior and present readings from five consecutive photosensitive elements in the photosensitive array 410. As long as the log 210 is moving in the direction designated by the arrow in FIG. 2, the central processing unit, connected to digital speed sensor 250 by cable 260, accumulates pulses from the digital speed sensor 250, which is connected to conveyor 220 by, for example, chain 255. After the log 210 leaves the field of view of the photosensitive array 410, the light pattern "substantially returns" to the original pattern stored in the memory and CPU 600 ceases counting pulses from digital speed sensor 250. "Substantially returns" may be defined by any appropriate algorithm, such as a pre-selected difference between the present and prior readings from a given number of consecutive photosensitive elements in array 410. A look-up table or other means may be then utilized to convert the number of pulses accumulated to units of length for display.

In an alternative method for measuring the length of log 210 scanner 100 can use an area array of light sensing elements and can be positioned sufficiently far from log 210 (or other object being measured) that the view of array 410 includes the full length of the log. Two mutually perpendicular lines of light-sensing elements in the area array can then be read out alternatively or in sequence to provide measures of both the length and width (or diameter) of the object being measured.

Alternatively a separate linear array can be used to measure length and in the manner previously described the output signals from this separate linear array will be related to the length of the log 210 and can be converted to dimensional information and displayed.

Figure 2B:
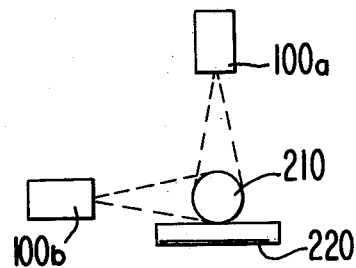

An embodiment utilizing two scanners 100a and 100b for measuring logs is shown in FIG. 2B. This embodiment is particularly useful for measuring logs having a longitudinal axis which is curved in three dimension or logs with non-circular cross-sections. By utilizing two scanners 100a and 100b to measure two diameters at the same cross-section of log 210, the average diameter will be substantially independent of the position of the log 210 on conveyor 220. Certain advantages from using two scanners are more fully described in U.S. Pat. No. 3,787,700, previously cited herein. While the U.S. Pat. No. 3,787,700 discloses the advantages of using two linear arrays of scanning elements and particularly two such mutually orthogonal arrays mounted forty-five degrees (45°) from the vertical, this invention mounts two mutually orthogonal scanners 100a and 100b so that the centerlines of the lenses are vertical and horizontal respectively. This arrangement is particularly useful in measuring the correct vertical diameter and the correct horizontal diameter of a log cross-section. For example, with logs possessing substantially elliptically-shaped cross-sections, the major and minor axes of an ellipsoidal cross-section (which correspond to major and minor diameters of the cross-section of the log) can be measured independently. This then allows a saw mill to set what are called the top and side heads (i.e., vertically cutting and horizontally cutting saws) in an optimum manner to convert the log to a rectangularly shaped cant. Prior art systems, to the contrary, sometimes assumed that logs possessed substantially circular cross-sections. In addition, the use of scanners 100a and 100b will reduce the effect of knots or limb stubs upon the perceived average diameter of log 210.

Another advantage of the scanner embodiment shown in FIG. 2B is that each scanner can be utilized to detect an edge of the object to thereby provide a signal to the other scanner to indicate the distance between the object and the other scanner. This is done by detecting the particular photosensitive element in one array which produces the first output signal significantly different from the background and correlating the location of this photosensitive element to the location of the edge by using a stored lookup table, for example, or a formula based on trigonometric principles. This calculation can be done in a computer using well known programming principles and information from the two scanners, or using a hard-wired, special purpose computer. Of course, the more precisely the object-scanner distance is known the more accurate will be the measurements by the other scanner. On veneer lathes, for example, this technique facilitates close control of the knife edge used for peeling a layer of wood from a log.

C. Physical Configuration of One Embodiment of Scanner 100

Figure 3A:
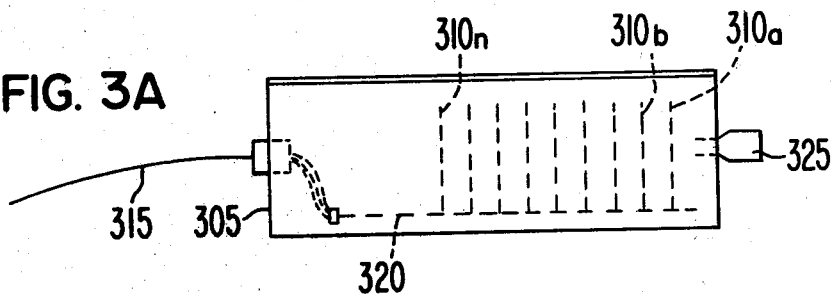
FIGS. 3A and 3B depict the physical arrangement of the components of one embodiment of this invention.
Figure 3B:
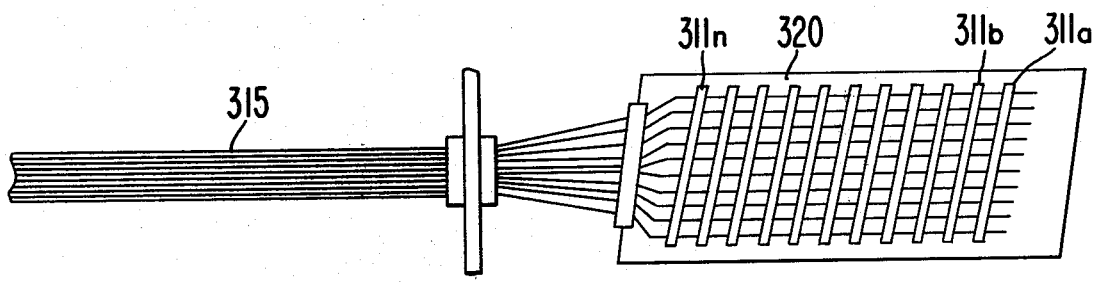

Two views of one possible physical configuration of scanner 100 are shown in FIGS. 3A and 3B. FIG. 3A is a side view, while FIG. 3B is a top view. Depicted in FIG. 3A are a case 305, printed circuit boards 310a through n (n is any required number sufficient to enable all circuits of scanner 100 to be placed within case 305) containing the necessary computer and control circuitry, mother board 320, power cable 315 and lens 325. Lens 325 may be any suitable lens known in the prior art, for example, in one embodiment lens 325 is a 10.5 millimeter, f2 anastigmatic. Shown in FIG. 3B are power cable 315, mother board 320, and printed circuit board edge connectors 311a through n. The power cable may be also utilized to transmit signals from scanner 100 to other apparatus, for example, to another computer maintaining inventory records. In one embodiment the dimensions of the case 305 are fourteen inches in length, five inches in width, and six inches in height. While these dimensions yield a particularly compact sensing and processing unit with its associated advantages such as ease of handling and replacement, the size, of course, can vary.

D. System Operational Modes

The operation of the circuitry of scanner 100 can be conveniently viewed as being in three different, but possibly overlaping in time, modes—"timed charge," "conversion," and "processing." The simplified timing diagrams in FIGS. 3C, 3D, 3E, 3F, 3G, 3H, 3I and 3J show the interrelationships of these modes for two different cases. The "timed charge" or "charge" mode of operation, FIGS. 3C (case 1) and 3G (case 2), is defined as that controlled or measured time during which charge is accumulating in the individual elements of photosensitive array 410. In addition, the timed charge mode includes the time during which the previously accumulated charges in the elements of array 410 are transferred from the charge storage elements to the analog shift registers of array 410 (when array 410 is a CCD array), and then discharged from the registers and discarded; that is, the operations referred to herein as "transfer" and "flush," respectively. Although the transfer and flush operations are shown only on the "A" cycle of FIGS. 3C and 3G, it should be understood that these operations occur in every cycle, for example, cycles "B", "C", "D", "E", etc.

The "conversion" mode, FIGS. 3D and 3H, is defined as the time during which analog to digital converter 470 is converting the timed charge from each element of array 410 from analog to digital form. Of course, because photosensitive array 410 will be exposed to ambient light regardless of the mode of operation of scanner 100, charge will accumulate in array 410 continuously. The charge which accumulates during the conversion mode is not useful and must be discarded. This untimed or uncontrolled accumulation occurs during the conversion mode and is shown in FIGS. 3F and 3J.

The processing mode, FIGS. 3E and 3I, is the operation of the system to process the digital data from A/D converter 470 by the remaining circuitry of scanner 100. The time during which the system is in the processing mode is shown in FIGS. 3E and 3I by the portions of these waveforms labelled "A", "B", "C", etc.

FIGS. 3C to 3F and FIGS. 3G to 3J show two possible examples of the overall operation of scanner 100. Case 1 (FIGS. 3C to 3F) shows the interrelationship of the previously defined three modes for relatively bright ambient lighting conditions. Case 2 (FIGS. 3G to 3J) shows the interrelationship for relatively dim ambient light. Note the relatively shorter time charge cycles in case 1 (FIG. 3C) as compared with case 2 (FIG. 3G). The rapidity of charge accumulation in FIG. 3C as contrasted with FIG. 3G results in an overlap of processing (FIG. 3E) with timed charge (FIG. 3C). Because of this overlap the circuitry of scanner 100 will discard or ignore the timed charge cycles which occur when the system is "busy" processing; for example, in FIG. 3C, cycles B and D will not be processed, and in general, only every other timed charge cycle will be processed. In contrast, note that in case 2 the timed charge cycle (FIG. 3G) is sufficiently long or slow to allow processing of every timed charge cycle—none need be discarded. Of course, depending upon the speed of the circuitry and the ambient light conditions, less frequent processing of the converted timed charge signals may occur, for example, one in ten cycles, or one in twenty cycles. This will all be further explained in the subsequent description.

E. Central Processing Unit 600

The operation of one embodiment of the circuitry of scanner 100 as depicted in schematic block diagram form in FIG. 1 and, in more detail, in FIGS. 5 through 9 will now be described. In the following description the value in ohms or microfarad (unless otherwise specified) or type, as appropriate, of a circuit component used in one embodiment of this invention will be placed in parentheses following the first reference to the component. Components of different values or types than those given can be used to vary the performance of the circuity, as desired. Also, throughout the description the terms high logic level, high level and high are used synonymously as are the corresponding terms with low instead of high. Typically, using currently available logic circuitry, a high will be a voltage greater than 2.5 volts, while a low will be less than or equal 2.5 volts although other voltage levels can be used as appropriate logic circuits become available. As power is applied to the system from a power supply not shown in the drawings, but of any suitable well-known type, central processing unit 600 begins to execute its programmed instructions, typically at the first address 0000. The central processing unit 600 depicted in FIG. 1 is shown in additional detail in FIG. 6. In the embodiment shown, central processing unit 600 is the model 3850 central processing unit associated with the Fairchild F8 Microcomputer System. Central processing unit 600 is described in detail in *An Introduction to Microcomputers* by Adam Osborne and Associates, Inc., published by the same in Berkeley, Calif. in 1975. The portions of the book relating to the F8 are incorporated herein by reference. Additional technical description, including operational theory, electrical interface specifications and system timing information, of the Fairchild F8 Microprocessor System is available in the Fairchild Semiconductor F8 Circuit Data Book, which is also incorporated herein by reference.

Central processing unit 600 (or CPU 600) includes connections for eight lines of bi-directional data designated DATA0 through DATA7 with DATA0 carrying the least significant bit and DATA7 the most significant bit. All data transfers on lines DATA0 through DATA7 are controlled by signals on the control lines ROMC0 through ROMC4, which are driven by central processing unit 600. The state of lines ROMC0 through ROMC4 will be determined by the program within CPU 600, and signals on these lines may also control the manipulation of the program within CPU 600.

The line designated CYCLE.CLK carries a timing pulse which occurs every 4 or 6 PH.CLK pulses depending upon the particular instruction being carried out by CPU 600.

The width of a pulse on CYCLE.CLK is equal to the PH.CLK cycle time. The trailing edge of a CYCLE.CLK pulse provides a reference for all timing diagrams. The CYCLE.CLK pulse is generated by CPU 600 in response to the XTLY signal input from crystal 539 and its associated circuitry. The CYCLE.CLK signal synchronizes all data transfers within scanner 100. CPU 600 also generates signals on PH.CLK which are related to those on CYCLE.CLK. The signals on PH.CLK control internal data manipulation within and among the various components of the computer system associated with photosensitive array 410, for example, CPU 600, RAM 730 and PROM 760. PH.CLK signals will be the same frequency as the signal XTLY derived from a crystal oscillator 539 by photosensitive array control circuit 500, and supplied to CPU 600.

The data bus driver signal placed on line DBDR* is an input to CPU 600 and serves to inhibit access to the data bus by all components connected to the data bus except a selected component as defined by the ROMC lines.

Line EXT.RESET* is also an input to CPU 600, and when active causes CPU 600 to reset an informal program counter to zero thereby restarting program execution at address 0000. Ports 00*-07* and 10*-17* are each connected to eight lines for bi-directional transfer of input and output data. Data bus pull-up resistors 603a to 603h (each 10k) are also shown in FIG. 6.

CPU 600 may be programmed to perform additional tasks beyond measuring the dimensions of an object, and in particular it may be programmed to interrelate with other equipment with which scanner 100 operates. For example, if scanner 100 is installed in a lumber mill, in addition to measuring log and lumber dimensions, it may supply information to other computers for use in accounting functions such as maintaining inventories of logs or lumber processed or it may supply information to various machine tools such as lathes or saws. Of course numerous other applications in addition to those mentioned may also be made of the information generated by scanner 100.

In one preferred embodiment of scanner 100, CPU 600 is relieved of the burden of subtracting by a hard wired subtractor (FIG. 14) of a type well known in the digital circuit arts. Such a subtractor reduces the number of subtraction operations which must be performed by CPU 600, thereby allowing faster processing of the signals supplied from array 410 by more directly subtracting the digital values representative of the background (and dark current if desired) from the signals representative of the present field of view.

Figure 14:
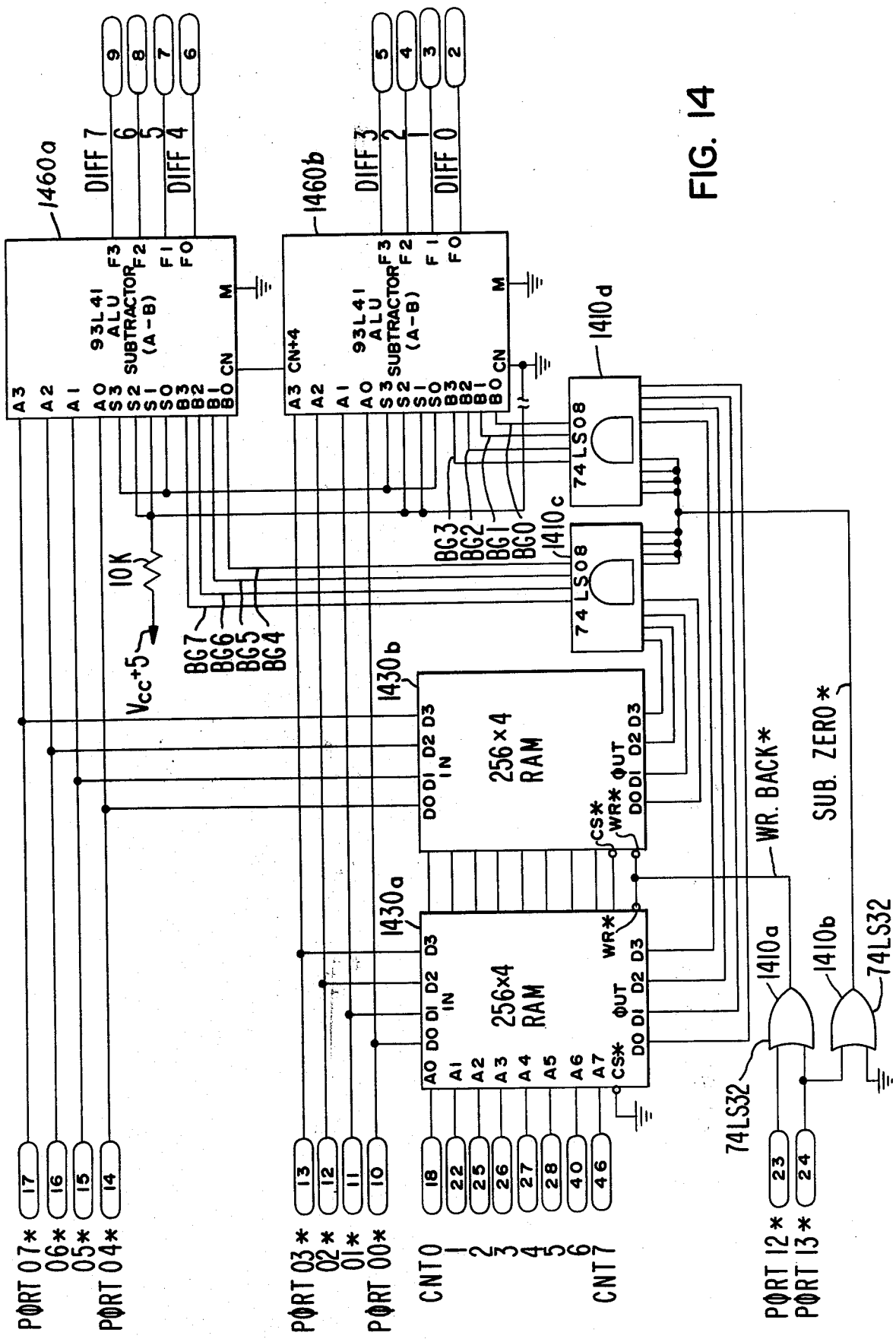
FIG. 14 is a schematic diagram of hard wired subtractor 1400.

FIG. 14 shows one appropriate subtractor. Such a subtractor is connected to receive output signals directly from A/D converter 470 (MN9324) and output signals from RAM 830, to perform the subtraction, and to supply output signals directly to RAM 730. In such an embodiment each digital byte representative of the background view of each element of array 410, all of said bytes stored in RAM 830, are subtracted from the corresponding digital signal representative of the view of each element of array 410 with an object present as the signals are supplied to the subtractor from converter 470. The difference between each byte in RAM 830 and the corresponding byte from converter 470 is stored as a series of bytes in RAM 730.

If utilized, one embodiment of the subtractor circuit of FIG. 14 includes eight lines (PORT 00* to 07*) for receiving data. Data on these lines may originate from CPU 600 or A/D converter 470. Addresses utilized by RAM's 1430a and 1430b (each Fairchild 3538) are supplied on lines CNT0 through CNT7. Operation of the subtractor circuit is controlled by signals from CPU 600 or A/D converter 470 on the lines designated PORT 12* and PORT 13*. Data from the subtractor circuit is supplied, depending upon the state of line PORT 13*, to RAM 830 on lines DIFF0 through DIFF7 from arithmetic logic units 1460a and 1460b (each a 93L41).

In operation asserting PORT 13* low allows PORT 12* to control the WR.BACK* signal via gate 1410a (74LS32). At the rising edge of WR.BACK*, data presented at the input connections of RAM's 1430a and 1430b is stored at the address specified by the signals on lines CNT0 to CNT7. As each byte is stored, the buffer memory 800 will increment the address. Signal SUB.-ZERO*, a duplicate of the signal at PORT 13*, then disables AND gates 1410c and 1410d (each 74LS08) to force the subtrahend to zero.

Subtraction of the background reading (output from RAM's 1430a and 1430b) from the present reading (PORT 00* to PORT 07*) is accomplished by ALU's 1460a and 1460b. When PORT 13* is high (not asserted), WR.BACK* is forced high via gate 1410a to disable further storage of the background reading. PORT 13* also enables gates 1410c and 1410d by forcing SUB.ZERO* high. The algebraic difference is then presented by the ALU's 1460a and 1460b as signals on lines DIFF0 to DIFF7.

F. Photosensitive Array Control Circuit 500

The photosensitive array control circuit 500 depicted in FIG. 1 is shown in detail in FIG. 5. The circuit in FIG. 5 is utilized to generate, with the proper interrelationship, the input signals for use in the circuit of FIG. 4. These signals include the system timing signal XTLY, video strobe signal VSTB, transfer signals TTL$\phi$XA and TTL$\phi$XB, analog shift register signals TTL$\phi$1 AND TTL$\phi$2, and a reset signal TTL$\phi$R. The interrelationship of the signals generated by many of the various components of circuit 500 is shown in FIGS. 10 and 11, and will be referred to in the following description.

Input/output control circuit 510, also shown on FIG. 5, includes program storage unit 518a (Fairchild 3851), programmed read only memory 518b (Signetics 82S23), pull-up resistors 513a through 513e (each 1K0), and signal inverters 516a through 516e (each 74LS04). Central processing unit 600 is able to monitor the condition of control circuit 500 depicted in FIG. 5 by sensing the condition of each bit of port B of program storage unit 518a. Decoding circuit 519 serves to allow only selected signal combinations on lines ROMC0 through ROMC4 to reach program storage unit 518a (Fairchild 3851).

When power is supplied to scanner 100, central processing unit 600 first clears input/output ports A and B of program storage unit 518a to a non-active state, which in this particular case is the high level. The clearing of output ports A and B of program storage unit 518a causes the other circuit components depicted in FIG. 5, which will have switched on in a random position, to cycle through various conditions and reach steady state positions. The components depicted in FIG. 5 form a system which will rapidly reach a steady state condition, at which time all operations in the circuit depicted in FIG. 5 essentially cease and await further signals generated by the program of central processing unit 600.

Crystal frequency source 539, a commercially available crystal frequency source, turns on and oscillates at a selected frequency, four megahertz in this embodiment. Crystal frequency source 539 is included within clock circuit 530 which also includes additional circuit components to smooth, stabilize and amplify the signal from source 539. These elements are resistors 533a (330) and 533b (330), capacitors 534a (1.0pf) and 534b (1.0pf) and signal inverters 536a, 536b and 536c (each 7404). Circuits such as clock circuit 530 are well known in the art. System clock generator flip flop 560a (74LS109), driven by the four megahertz output signal from inverters 536c, toggles at one-half the four megahertz rate, or two megahertz, and supplies the system timing signal, designated XTLY in FIG. 5, to central processing unit 600.

The previously mentioned clearing of output ports A and B of program storage unit 518a to the high level (all logical zeroes) causes the signal on the Q output lead from flip flop 577c to go to the high level, thereby enabling NAND gate 541d (74LS00). A high level output signal on the $A_0$ output port from PSU 518a enables NAND gate 541a thereby allowing the four megahertz clock signal from signal inverter 536c to be gated through selection network 540 to the first stage of the video shift control flip flop 557a (74LS109), resulting in a two megahertz clock rate at output terminals Q and "not Q." (In the drawings a "not" output is designated by a bar over the symbol. For example, the "not Q" output is designated $\overline{Q}$.) The two megahertz clock rate (FIG. 10C) appearing at output terminals Q and "not Q" of video shift control flip flop 557a is again divided by flip flop 557b (74LS109), producing alternating one megahertz analog shift register signals TTL$\phi$1 and TTL$\phi$2 (FIGS. 10D and 11F). Analog shift register signals TTL$\phi$1 and TTL$\phi$2 are used to flush the previously accumulated charge from the analog shift registers of photosensitive array 410 (FIG. 4) to the output terminals CS and OS (see array 410, FIG. 4) while the photosensitive elements in array 410 are charging. During this time, the low output signal from the "not Q" output lead of flip flop 577c (74LS109) transmitted to the parallel enable input of modulo 16 counter 577a causes this counter to load the signal "0100" from its parallel inputs for clock synchronization purposes. The low level signal on the "not Q" output of flip flop 577c also disables NAND gate 541e.

During this time, the VSTB signal (on the output lead from NAND gate 551c) is held at a high level by a low level output signal from inverter 576b (74LS04). The output signal from inverter 576b is controlled by the state of the $B_4$ port from PSU 518a.

One input lead to NAND gate 551a (74LS00) is connected to the "Q" output lead of JK flip flop 557a and thus is enabled every other period of the output signal from OR gate 541f (74LS00). The output signal from gate 541f is applied, through dual inverters 556a, 556b to the other input lead to NAND gate 551a thereby resulting in an output pulse with a width equal to the width of the output pulse from OR gate 541f but with a frequency equal to the frequency of the output signal from flip flop 557a. Thus the output signal from NAND gate 551a has a duty cycle equal to one quarter of its period. Likewise, the output signal from NAND gate 551b (74LS00) has a duty cycle equal to one quarter of its period but is shifted by one-half cycle in relation to the output signal from NAND gate 551a. The output signal from NAND gate 551a is denoted TTL$\phi$R.

When the integration time expires (timekeeping is performed by the counter internal to CPU 600, FIG. 1), CPU 600 forces I/O port bit $A_6$ (FIG. 5) on PSU 518a to a low level which in turn forces the output signal from NAND gate 571b (74LS00) to a low level. This output signal is transmitted to the parallel enable input to modulo 16 counters 579a and 579b (74163) thereby loading these counters in parallel with all ones corresponding to the 255 count. This causes the $C_{OUT}$ signal from counter 579a (74163) to go high, thereby enabling the J input of JK flip flop 577b (74LS109). The next clock pulse (from the "Q" output lead of flip flop 557a) transmitted to the clock input of 577b, causes flip flop 577b to change state. The low-to-high transition of the signal on terminal "Q" of flip flop 577b changes the state of flip flop 577c. Thus the control circuit goes to its next stable state which has the "Q" output signal from flip flop 577c low. This low level signal disables NAND gate 541d. The new high level output signal on the "not Q" output lead from flip flop 577c enables NAND gate 541e in clock selection network circuit 540. The output signal from NAND gate 551c is still held high thereby disabling the VSTB signal which controls the operation of analog to digital converter 470 (FIG. 4). Converter 470 converts the analog output signal from photosensitive array 410 into binary coded form.

The change in the level from high to low of the output signal on the "not Q" output lead from flip flop 577b in response to the positive-going leading edge of the clock pulse from the "Q" output lead of flip flop 557a following the output pulse from counter 579a enables PROM 578 and drives the output lead from NAND gate 571a to a high level thereby enabling counter 579b.

The high output signal on the "not Q" output lead from flip flop 577c enables counter 577a and also enables NAND gate 541e, thereby switching the clock selection network circuit 540 to its slow mode of operation. This high level output signal also releases flip flop 560b (74LS109).

The output signal from OR gate 541c (74LS00) is transmitted to the clocking input of counter 577a. The high level output signal on the "not Q" output lead of flip flop 577c has parallel loaded counter 577a with the sequence 0100 (note that the "C" input is connected to the high level output signal on input lead 20 to photosensitive array control circuit 540). This high level signal also is transmitted to the enable input lead of counter 577a thereby placing counter 577a in a condition ready to count in response to the high level signal on its parallel-enable input "not L". Flip flop 560b produces an output signal every sixteen clock pulses input to counter 577a. The clock pulses from the "Q" output lead from flip flop 560b are transmitted to one input lead of enabled NAND gate 541e and then are used to clock flip flop 557a. The output signal on the "Q" output lead from flip flop 557a then is used to clock counter 579b. Note that counter 579a is disabled (enabled) by a low (high) level output signal on its reset input lead ($\overline{R}$) derived from the "Y6" output from PROM 578.

The output signal from inverter 536c in clock network 530 is transmitted through NAND gate 541a, enabled by a high level output signal on the $A_0$ output lead from PSU 518a, and then transmitted through NOR gate 541c to the clocking input lead $C_P$ of divide-by-16 counter 577a. Counter 577a has been enabled by the high level output signal on the "not Q" output lead from flip flop 577c. The output signal from counter 577a is transmitted to the clocking input of flip flop 560b which has been released by the high level output signal on the "not Q" output lead of flip flop 577c. Flip flop 560b further divides the output signal from NOR gate 541c by two. This output signal appears on the "Q" output lead from flip flop 560b and is transmitted to one input lead of enabled NAND gate 541e. Thus the "slow" output signal from NAND gate 541e, transmitted through OR gate 541f, is one thirty-second the frequency of the output signal from inverter 536c.

The slow clock output signal from NOR gate 541f is used to clock flip flop 557a. The output signal on the "Q" output lead of flip flop 557a (one sixty-fourth of the frequency of the output signal from inverter 536c) is transmitted to the clocking input of counters 579b and 579a. Thus counter 579b now counts at one sixty-fourth the frequency of the output signal from inverting amplifier 536c. Counter 579a is enabled only when the output signal on the "$C_{OUT}$" output lead from counter 579b goes to a high level simultaneously with the appearance of a positive-going clocking pulse on the clocking input $C_P$.

Although counters 579b and 579a where loaded with all one's upon the appearance of a low level output signal from NAND gate 571b, the output signal from NAND gate 571b returned to a high level upon the appearance of a low level output signal on the "Q" output lead from flip flop 577c in response to the next following clocking signal from flip flop 577a appearing simultaneously with the high level output signal on the "$C_{OUT}$" output lead of counter 579a. This output pulse, which corresponds to a 255 count in counters 579a and 579b, is shown in FIG. 10G and the relationship of this count to the counter value in counters 579a and 579b is shown in FIG. 10H.

The output signals from counter 579b are transmitted to PROM 578a which has been preprogrammed to respond to these output signals to control the transfer of charge packets from the light sensing elements of photosensitive array 410 to the shift registers contained on this array. Thus counter 579b starts counting up and causes PROM 578 to generate the transfer signals TTL$\phi$XA and TTL$\phi$XB used to shift charge packets accumulated in array 410 from the photosensitive elements in array 410 to the shift registers in array 410.

The enabling of PROM 578 results in the following sequence of states on the output leads Y1 through Y6 of PROM 578 in response to the states "0000" through "0006" from counter 579b.

| 579b State | 578 Outputs | Action |
|---|---|---|
| 0000 | Y2 = 0 | TTL XA active. Start transferring charges into array 410 shift register A. |
|  | Y1 = 0 | Hold 557B to a still state in order to disable shift pulses TTL$\phi$1, and TTL$\phi$2 |
|  | Y4 = 1 | while transferring charges into shift register. |
| 0001 | Y2 = 1 | TTL$\phi$XA inactive. |
|  | Y1 = 0 | Shift pulses disabled. |
|  | Y4 = 1 |  |
| 0002 | Y2 = 1 | TTL$\phi$XA inactive |
|  | Y4 = 0 | TTL$\phi$XB active in order to transfer charges into shift register B of array 410 |
|  | Y1 = 0 | Shift pulses TTL $\phi$ 1 and TTL $\phi$ 2 disabled |
| 0003 | Y4 = 1 | TTL$\phi$XB inactive |
|  | Y1 = 1 | Shift pulses TTL$\phi$1 and TTL$\phi$2 enabled |
| 0004 | No change |  |
| 0005 | No change |  |
| 0006 | Y6 = 0 | Reset 577B, reset counters 579A and 579B to all zeroes. |

As shown in the above table describing the signal levels on the output leads from PROM 578 in response to the count on the $Q_A$ through $Q_D$ output leads from counter 579b, during the first state corresponding to the count "0000" on these output leads, the output signals on leads Y2 and Y1 are both zero. Thus TTL$\phi$XA, connected directly to the Y2 output lead, goes to a low level and is "active." TTL$\phi$XA remains at a low level (FIG. 10L) for slightly more than one cycle of the output signal from flip flop 557a and during this time selected charge packets are transferred from half of the photosensitive elements in array 410 to one of the two shift registers formed on the same semiconductor chip as the photosensitive elements.

The next output state of counter 579b is "0001". During this state, the output signal on the Y2 lead from PROM 578 goes to one thereby driving the TTL$\phi$XA signal to a high level and rendering this signal inactive. The output signal on the Y1 output lead from PROM 578 remains low level, thereby disabling flip flop 557b and disabling the shift pulses TTL$\phi$2 (FIG. 10D) and TTL$\phi$1 used to drive the two shift registers on either side of the linear array of photosensitive elements in photosensitive array 410.

The next state from counter 579b corresponds to "0010" in binary or "0002" in decimal. During this state, the output signal on Y2 remains high, maintaining TTL$\phi$XA inactive. Also the output signal on Y1 remains zero disabling shift pulses TTL$\phi$1 and TTL$\phi$2. The output signal on the Y4 output lead goes to zero rendering TTL$\phi$XB active (FIG. 10M) (i.e., dropping the signal level to a low level) thereby to transfer the charge in those light sensitive elements in photosensitive array 410 controlled by the $\phi$XB transfer gate to the second shift register formed on the same semiconductor chip with the light sensing elements comprising photosensitive array 410.

The relationship of these signals to the structure of the photosensitive array 410 is shown in a preliminary data sheet dated Mar. 1974 for the CCD 110 256 element image sensor produced by Fairchild Semiconductor Division of Fairchild Camera and Instrument Corporation. This data sheet is hereby incorporated herein by reference.

The next output state from counter 579b corresponds to "0011" or to decimal "0003". During this state, the output signal on lead Y4 goes to a high level (see FIG. 10M). Simultaneously, the output signal on lead Y1 from PROM 578 goes to a high level thereby enabling flip flop 557b. On the next positive going pulse from inverter 556b, the output signals on the "Q" and "not Q" output leads from flip flop 557b are transmitted to photosensitive array 410. These signals, corresponding to the TTL$\phi$2 and the TTL$\phi$1 signals, then operate as shown in FIG. 10D (TTL$\phi$1 is just an inverted version of TTL$\phi$2) to transfer the charge packets stored in the two shift registers associated with photosensitive array 410 from the photosensitive aarray to the processing circuitry shown in FIG. 4. The operation of this processing circuitry will be described shortly.

During output states "0100" and "0101" TTL$\phi$XB remains inactive, (as does TTL$\phi$XA) and shift pulses TTL$\phi$1 and TTL$\phi$2 continue to be enabled.

During the "0110" output state (corresponding to the decimal "0006"), the output signal on the Y6 lead goes to zero thereby resetting counters 579a and 579b to all zeroes and resetting flip flop 577b. This last state of PROM 578 forces control flip flops 577b and 577c to the state such that the signals on the "Q" output leads from both of these flip flops are low level. This condition initiates, and is maintained throughout, the conversion mode of operation of the scanner. The conversion mode consists of two phases: controlled transfer of video charge from the photosensitive elements in photosensitive array 410 and the actual analog-to-digital conversion.

Note that during states "004," "005," and "006" of PROM 578 the output signals TTL$\phi$2 and TTL$\phi$1 generated on the "Q" and the "not Q" output leads from flip flop 557b have been transmitted to the photosensitive array 410. Thus these two output signals have been driven one and one-half cycles prior to the beginning of actual analog-to-digital conversion. This corresponds to the driving of the charge packets in the two shift registers associated with the photosensitive array through those extra stages of the shift registers necessary to bring the first charge packet in one of the shift registers to the output circuitry associated with the photosensitive array in preparation for conversion of this analog signal into a digital code word. A review of the above referenced data sheet for the CCD 110 shows the necessity for these pulses.

Upon resetting counters 579b and 579a to zero, the output signal on lead Y6 from PROM 578 returns to the high level. See FIG. 10N. This enables counters 579b and 579a to begin counting for the conversion process.

Throughout the actual analog-to-digital conversion, the high level output signal on the "not Q" output lead from flip flop 577b disables PROM 578. The output signal on the "not Q" output lead of flip flop 577c is at a high level throughout the conversion mode. Thus NAND gate 571c produces a low level output signal which, transmitted through inverter 576b enables NAND gate 551c. NAND gate 541e remains enabled thereby maintaining the clock control network circuit in the slow count mode.

Video strobe signal VSTB (FIG. 10O) has a 25% duty cycle in accordance with the recommendation of the manufacturer of the A-D converter and is generated once every two cycles of the output signal from OR gate 541f (See FIG. 10B). The conversion cycle continues until counters 579a and 579b reach full count (corresponding to 255 in decimal notation). When the count reaches 255, the carry out signal ($C_{OUT}$) from counter 579a (a high level signal) conditions the J input of flip flop 577b so that the next clock pulse sets flip flop 577b thereby changing the state of both 577b and flip flop 577c such that the "Q" output leads from these two flip flops have high level signals thereon and the "not Q" output leads from these flip flops have low level signals thereon. The transition of the states of the output signals on the "Q" and the "not Q" output leads from flip flop 577c disables NAND gate 541e and enables NAND gate 541d, thereby converting the clock control network circuit to the fast clock mode of operation. Simultaneously, counters 579b and 579a are disabled by a low level output signal from NAND gate 571b.

During the reading out of the charge packets stored in the two shift registers adjacent the 256 light sensing elements in photosensitive array 410, the light sensing elements continue to accumulate charge in response to radiation incident thereon. Prior to the next charge cycle, it is necessary to transfer the charge packets accumulated in these light sensitive elements to the adjacent shift registers and then flush these transferred charge packets from the photosensitive array 410. This is done using the fast clock sequence at the start of the charge mode. This charge mode is entered after the charge packet accumulated in the 256th element of the photosensitive array during the previous charge mode has been converted to a usable video signal. At the start of this mode, counters 279a and 279b are enabled by a high level output signal from NAND gate 571a. This high level output signal is generated in turn by switching the output signals on the "Q" and the "not Q" output leads of flip flop 577b from low and high respectively, to high and low in response to the 255 count $C_{OUT}$ signal from counter 579a signalling the end of the previous conversion mode.

The low level output signal on the "not Q" output lead from flip flop 577b enables PROM 578. Accordingly, PROM 578 is cycled through its six output states as described above in conjunction with the transfer sequence at the end of the charge cycle. However PROM 578 is cycled through these steps much more rapidly in response to the fast clock signal from OR gate 541f than at the beginning of the charge mode. The operation of the photosensitive array control circuit during this fast transfer sequence is as described above in conjunction with the slow transfer sequence. Accordingly this operation will not be described again.

In the 0006 state of counter 579b, the output signal on the Y6 lead from PROM 578 goes to a low level, thereby disabling and resetting counter 579b. Flip flop 577b is reset by this signal such that the output signals on its "Q" and "not Q" output leads go to low and high levels, respectively. The signals on the "Q" and "not Q" output leads from flip flop 577c remain at high and low levels, respectively. This enables NAND gate 571a and initiates the beginning of a controlled charge cycle within photosensitive array 410. CPU 600 is notified of this fact by the output signal from NAND gate 571a going to a low level and being transmitted to I/O port $B_0$ on PSU 518a. This signal is also transmitted to the static memory interface 710 shown in FIG. 7 and used as the interrupt signal to initiate charge cycle timekeeping. The duration of the charge cycle is controlled by the clock on CPU 600 (see FIGS. 1 and 10F).

During the conversion mode, reset signal TTL$\phi$R is provided at the output of NAND gate 551a. Reset signal TTL$\phi$R clears the charge packet from the output diode associated with CCD 110 in photosensitive array 410 after the amplitude of each charge packet has been determined by the readout circuitry associated with photosensitive array 410 (to be described in conjunction with FIG. 4).

A few general remarks on the operation of the photosensitive array control circuit 500 are appropriate. From the above description it is apparent that clock selection network circuit 540 serves to select the appropriate clock rate for utilization by the remainder of the circuitry of this invention. Because photosensitive array 410 is continually sensing ambient light conditions and accumulating charge in proportion to the ambient light conditions, it is necessary to "flush" the previously accumulated charge from photosensitive array 410 immediately before desired measurements are made by array 410. Clock selection network circuit 540 accomplishes this "flushing" by providing a high clock rate to photosensitive array 410 during the "flush" cycles when the data contained within photosensitive array 410 will not be utilized and by providing a slower clock rate when the analog signals from photosensitive array 410 are to be converted to digital form and stored.

Typically, the central processing unit 600 will be programmed not to perform any program operations for a predetermined length of time after start of operation, which time will allow the previously described steady state to be arrived at by the circuit depicted in FIG. 5. In one embodiment this period is 4.096 milliseconds.

Because the apparatus of this invention will not have been used for a period of time prior to utilizing it for any given measurement, central processing unit 600 is programmed to execute emptying (i.e., transfer and flush) of the charge accumulated within the elements of photosensitive array 410, immediately after the system reaches its steady state condition. This is performed because the charge in the individual elements of photosensitive array 410 may have accumulated over an undesirably long time if this system has not been used for a period of time.

Central processing unit 600 can issue control signals to photosensitive array 410 through port A of program storage unit 518a. For example, diagnostic testing can be performed during the initial operation of scanner 100 by programming central processing unit 600 to issue control signals to photosensitive array 410 through port A of program storage unit 518a. During diagnostic testing CPU 600 provides a clock signal of the necessary frequency at terminals A0 and A1 of PSU 518a. This signal is supplied to circuit 500 through signal inverter 546, NAND gates 541a and 541b, and NOR gate 541c one clock pulse at a time. By monitoring port B and sensing the signals received there, central processing unit 600 can detect improper functioning of selected system elements.

The low from NAND gate 571a during a charge cycle without conversion is applied to terminal $B_0$ of program storage unit 518a. The low condition of $B_0$ of PSU 518a is detected by central processing unit 600 which allows charging to continue for a predetermined time. CPU 600 has been suitably programmed to recognize this condition as indicating that the photosensitive array control circuit 500 (FIG. 5) is in a charge cycle. The term charge cycle is used herein to designate that phase of the operation of this invention wherein charge is accumulating within the individual light sensing elements of photosensitive array 410 for the purpose of being further processed in the operation of the system. "Charge cycle" is to be contrasted with "conversion cycle" which designates the cycle when analog-to-digital converter 470 is operating. Central processing unit 600 counts charge integration time and has signaled the start of the conversion cycle by changing the level of the output signal on terminal A6 of program storage unit 518a thereby terminating the charge cycle. Of course light sensing elements in array 410 will continue to accumulate charge during the conversion cycle, but this charge will not be processed by the system.

By the time the previously described conversion cycle has been completed, another transfer from the photosensitive elements of array 410 will be necessary to discard the charge packets which accumulated in the elements during the conversion cycle. Utilizing exactly the same transfer sequence as previously described, this unwanted charge is output from photosensitive array 410, but not utilized by central processing unit 600. At the completion of this cycle two highs are supplied to NAND gate 571a thereby generating an enabling low which blocks counters 579a and 579b. This same signal is presented to the central processing unit 600 via terminal B0 of program storage unit 518a. Upon receipt of this information, central processing unit 600 begins timing the next charge cycle in photosensitive array 410.

In one typical operational cycle as controlled by the circuit shown in FIG. 5, photosensitive array 410 will flush for approximately six milliseconds, integrate charge for about two hundred microseconds, then transfer the charge to the operational amplifier circuit 450, following which time that data will be converted to digital form by analog to digital converter 470.

G. Photosensitive Array Circuit 400

FIG. 4 is a schematic diagram of the circuitry included within block 400 in FIG. 1. At the center of FIG. 4 is a photosensitive array 410. In general, photosensitive array 410 may, with appropriate external circuitry, be any device, such as a linear array of photodiodes, capable of sensing variations in ambient lighting. In the preferred embodiment depicted in FIG. 4, photosensitive array 410 is a charge coupled solid state linear image sensor having 256 elements, manufactured by Fairchild and denoted as the "CCD 110." The circuitry of this device appears in a preliminary data sheet entitled "CCD 110 255-Element Image Sensor" published by Fairchild and dated March 1974. This data sheet is incorporated by reference. The CCD 110 includes two charge transfer gates, two two-phase analog shift registers, an output charge detector/pre-amplifier, and a compensation output amplifier. An optical glass window protects the image sensing array while allowing it to sense ambient lighting conditions. Other devices, such as photodiode arrays, are also suitable for use in photosensitive array 410 and are readily available commercially. However the circuitry in FIG. 4 would have to be appropriately modified to be compatible with the particular device selected.

In operation photosensitive array 410 senses the intensity of the ambient lighting incident on each of the 256 elements of photosensitive array 410. Transfer signals TTL$\phi$XA and TTL$\phi$XB, from control circuit 500, applied to terminals $\phi$XA and $\phi$XB, cause the transfer of the accumulated electric charge in each of the 256 photosensitive elements to two 128 element shift registers on opposite sides of the photosensitive elements. One pulse of transfer signal $\phi$XA causes the transfer of the accumulated charge in every other one of the elements of photosensitive array 410 into corresponding elements of one shift register, and one pulse of transfer signal $\phi$XB causes the transfer of the accumulated charge from the remaining elements of photosensitive array 410 into the corresponding elements of the other shift register. The contents of these analog shift registers are then output from terminal OS one element at a time by application of appropriate analog shift register signals TTL$\phi$1 and TTL$\phi$2 (FIG. 15D) to terminals $\phi$1A, $\phi$1B, $\phi$2A and $\phi$2B of photosensitive array 410. Resistors 413a, (1K), 413b (1K), 413c (4.7K), and 413d (4.7K) and capacitors 414a (0.47) and 414b (0.47) are biasing and clamping circuitries supplied at the recommendation of the manufacturer of photosensitive array 410. To remove noise generated in the output circuitry of photosensitive array 410 from the analog signal transmitted to converter 470, a compensation amplifier is provided as part of array 410. The output signal from this amplifier contains the same noise as the output signal from the output shift registers output on terminal OS to the extent this noise is generated in the gated charge detection preamplifier formed on the same semiconductor chip as the linear array of photosensitive elements. This noise compensation signal is output on terminal CS.

The output signal from the OS terminal of photosensitive array 410 is transmitted through blocking and level shifting capacitor 454a to the negative input terminal of operational amplifier 459. Simultaneously, the output signal from the compensation amplifier on photosensitive array 410 is transmitted on the CS output terminal through blocking and level shifting capacitor 454b to the positive input terminal to operational amplifier 459. This amplifier subtracts one signal from the other thereby to cancel the common mode noise contained in the two signals and transmits the resulting signal through blocking capacitor 454g to the AI input of analog to digital converter 470. The output signal is filtered and halfwave rectified by diode 455 in conjunction with capacitor 454h and resistor 453g. Thus the positive portions of the output signal from amplifier 459 (which acts as an inverting amplifier) are transmitted to the input to converter 470.

Because photosensitive array 410 is typically a charge coupled device it is necessary to shift the level of incoming signals to an appropriate level. This level shifting is accomplished by TTL/CCD interface circuit 430. The TTL/CCD interface circuit 430 is included within photosensitive array circuit 400 at the recommendation of the manufacturer of photosensitive array 410—Fairchild, in the embodiment described. Included within TTL/CCD interface circuit 430 are four NOR gates 431a, 431b, 431c and 431d (all of chip type 9607), and resistors 433a, 433b, 433c and 433d (each 51). TTL/CCD interface circuit 430 serves as an interface between the transistor transistor logic of the photosensitive array control circuit 500 which generates the analog shift register signals TTL$\phi$1 and TTL$\phi$2, and the transfer signals TTL$\phi$XA and TTL$\phi$XB, all eventually used to control photosensitive array 410. The signal TTL$\phi$R is used during the conversion cycle to clear the previously sensed charge from the charge detection diode used in the gated charge detector preamplifier associated with the CCD 110 array. The signal TTL$\phi$R is generated as previously described and is shown in FIG. 10E.

Power supply control circuit 420 (FIG. 4) provides the appropriate voltage levels and pulsing (TTL$\phi$R) to the reset terminal ($\phi$R) (one pulse to remove each charge packet from the gated charge detector preamplifier after it generates a signal which has been transferred to converter 470) of photosensitive array 410. A positive 15-volt signal is applied through resistor 423c to the reset transistor drain terminal (RD) of photosensitive array 410 and directly to output transistor drain terminal (OD) of photosensitive array 410. Power supply and control circuit 420 includes a zener diode 425a (1N747, 3.6v) for protection against voltage surges, a supply transistor 422a (2N5321), a switching transistor 422b (2N3638A), and diode 425b (1N916). Resistors 423a (1.5K), 423b (1.8K), 423c (100), 423d (100), 423e (4.7K), 423f (1.2K) and capacitors 424a (1.7), 424b (0.1), and 424c (0.33) all function to smooth the power output of power supply control circuit 420.

Protection and clamping circuit 440, also included within photosensitive array circuit 400 pursuant to the recommendation of Fairchild, the manufacturer of photosensitive array 410, is also shown in FIG. 4. During the readout of the charge packets from photosensitive array, negative going signal TTL$\phi$R is applied to the base of transistor 422b thereby turning on this transistor.

Normally, no current flows in the path containing diode 425a and resistor 423a. Accordingly, transistor 422a is biased off. A positive voltage surge on the plus 15 line causes diode 425a to break down and conduct. The voltage drop across resistor 423a turns on transistor 422 and the emitter current of transistor 422 is passed through resistor 423f. Capacitor 424a charges to an average voltage determined by the time constant of the regulated circuit. During normal operation, when transistor 422a is not conducting, the application of a negative TTL$\phi$R pulse to the base of transistor 422b turns on this transistor and results in emitter current passing through resistor 423e. This emitter current creates a negative potential on the non-grounded side of capacitor 424a and creates a current flow from ground to the emitter of transistor 422b through resistor 423f. Also a current flow through resistors 423f and 423b tends to bring the base of transistor 422b back to ground. The base of transistor 422b is normally grounded. The resulting current discharges the gated charge detector preamplifier through transistor 422b, resistor 423e and resistor 423f to ground. Diode 445a (IN916) clamps the voltage across capacitor 444c at about the forward breakdown voltage of pn junction. Diodes 445b through 445e (each IN916) prevent any substantially negative-going signal on the TTL$\phi$1, TTL$\phi$2, TTL$\phi$XA and TTL$\phi$XB leads. Diode 445f (IN916) prevents any substantially positive signal on the collector of transistor 422b. One input lead of OR gates 431a, 431b, 431c and 431d is connected to the leads carrying the signals TTL$\phi$1, TTL$\phi$2, TTL$\phi$XA and TTL$\phi$XB, respectively. The other two input leads of these OR gates are connected to a positive 5-volt potential through resistor 443a, as shown. These OR gates are connected to serve as voltage level shifters between TTL and CCD components.

Solid state regulator 449 (78MO8) provides an eight volt supply to TTL/CCD interface circuit 430.

The output signals from photosensitive array 410 appear as sequential signals on terminals OS and CS, which are connected to operational amplifier circuit 450. Capabitors 454a and 454b together with resistors 453a (1K) and 453f (1K) conduct the output current on these two terminals to ground and, in doing so, convert these currents to voltages. The magnitude of the current on terminal OS at a given time is controlled by and related to the amplitude of the particular charge packet from the photosensitive array then in the gated charge detector preamplifier. (This charge packet is applied to the gate of, and thus controls the output current from, an MOS transistor.) The variable intensity output signals on the OS and CS terminals are level shifted by capacitors 454a (0.33) and 454b (0.33). A balanced signal is achieved by utilizing resistors 453d (1K), 453e (1K) and variable resistor 453c (500). The resulting signals are supplied to operational amplifier 459 (715 DC). Operational amplifier 459 is a conventional, monolithic, high-speed operational amplifier available commercially. The circuit to the right of operational amplifier 459 includes resistors 453g (330), 453h (10K) and 453i (510K), and capacitors 454c (47pf), 454d (6.8), 454e (270 pf), 454f (470pf) and 454g (0.33) which provide frequency compensation for particular operational amplifier chosen as operational amplifier 459. This circuitry usually will be specified by the manufacturer of amplifier 459. Diode 455 (1N916), resistor 453g (330) and capacitor 454h (0.33) serve to eliminate negative excusions of the output signal from amplifier 459, resulting in only positive voltage excursions being supplied to analog to digital converter 470.

In one embodiment, the output signals from operational amplifier 459 are adjusted to be a series of analog pulse signals each having amplitude between zero and 10 volts. These analog signals, supplied to analog to digital converter 470 through lead AI are converted into a series of digital signals, each signal having eight binary bits. For example, an analog pulse of amplitude zero volts is translated by analog to digital converter 470 into an output of zero on each of the eight leads AD00 to AD07 from analog to digital converter 470. If an input signal of ten volts is supplied to lead AI, an output signal of one appears on each of the eight leads AD00 to AD07. Intermediate input voltages, of course, result in output digital signals representative of intermediate binary numbers from the analog to digital converter 470.

As each amplified analog pulse from operational amplifier circuitry 450 is supplied to terminal AI of analog to digital converter 470, the video strobe signal VSTB (FIG. 10O) is supplied to terminal SC of analog to digital converter 470. As explained above in conjunction with the description of FIG. 5, video strobe signal VSTB is typically equal to twenty-five percent (25%) of the shift period of a single photosensitive element within photosensitive array 410. As video strobe signal VSTB goes low, analog to digital converter 470 is caused to be reset and prepared for the next incoming analog pulse at terminal AI. VSTB (FIG. 10O) has a 16 microsecond period and a twenty-five percent (25%) duty cycle. Thus 4.096 milliseconds is required to read out and convert to digital form the 256 charge packets accumulated in the light sensing elements of photosensitive array 410. Four microseconds after it goes low, the video strobe signal VSTB will return high, with the leading edge of signal VSTB timed to coincide, by circuit 500, with the maximum amplitude of the analog signal supplied to terminal AI of analog to digital converter 470. System timing signal XTLY is applied to terminal C. Analog to digital converter 470 then proceeds to convert the analog input signal appearing at terminal AI into an eight bit digital signal to be output through terminals AD00 through AD07. At the completion of each conversion, analog to digital converter 470 generates a negative signal CONVERT* which is supplied via terminal "not EOC" to the circuit depicted in FIG. 8, and functions to switch the circuit depicted in FIG. 8 into a condition to receive the data present at output terminals AD00 to AD07 of analog to digital converter 470.

H. Buffer Memory 800.

Figure 8:
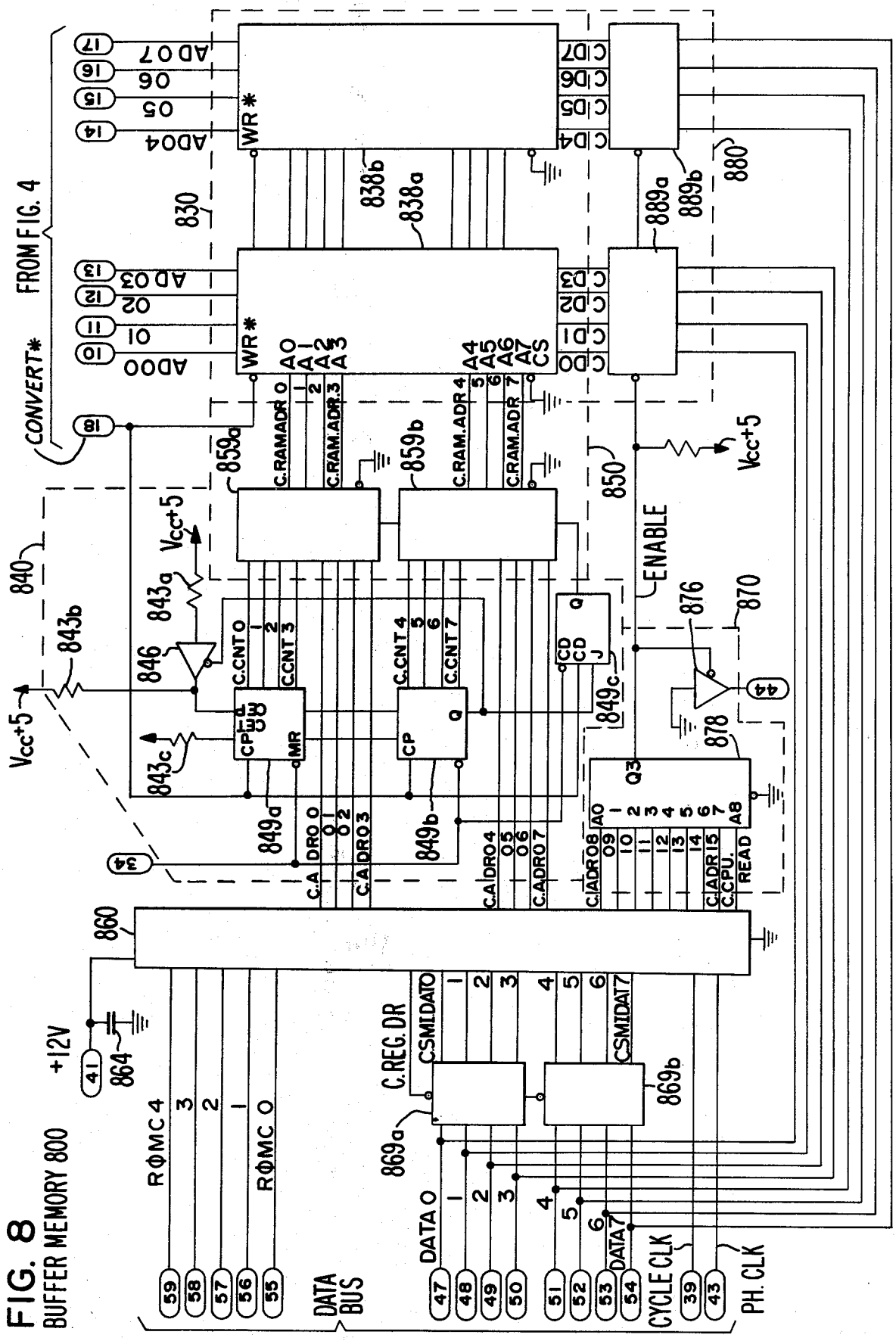
FIG. 8 is a schematic diagram of buffer memory 800 of FIG. 1.

The buffer memory 800 depicted in FIG. 1 is shown in additional detail in FIG. 8, Buffer memory 800 includes random access memory 830 (two 256×4 Fairchild MOS Random Access Memories type 3538), counting circuit 840, multiplexing circuit 850, static memory interface (or SMI) 860 (Fairchild 3853), decoder circuit 870, and buffer circuit 880.

Random access memory 830 provides temporary storage of the output from analog to digital converter 470. After each of the 256 analog signals originating in photosensitive array 410 has been converted to an eight bit digital word, the 256 eight bit words are stored in random access memory 830 which comprises 256 bytes. The addresses for storage of each eight bit byte from analog to digital converter 470 are generated by counting circuit 840 in response to the signals on "CONVERT*" from A/D converter 470. Multiplexing circuit 850 provides an interface between SMI 860 and memory 830 and between counting circuit 840 and memory 830.

As each eight bit code word appears at the output of analog to digital converter 470, the data will be accepted and stored in the random access memory 830. When the CONVERT* signal applied to terminals WR* of random access memory 838a and 838b (each is a 256×4 Fairchild 3538 and the data sheet of this part is hereby incorporated herein by reference) goes low, it enables storage of the data supplied on lines AD00 through AD07 input to random access memory 830. When the CONVERT* signal returns to a high level it causes counters 849a (93L16) and 849b (93L16) to be incremented to the next address. Counters 849a and 849b thereby function with multiplexers 859a (93L22) and 859b (93L22) to generate a series of addresses for the storage of data supplied to random access memory 830 from analog to digital converter 470. After the storage of all 256 eight bit digital signals from analog to digital converter 470, a high output will be presented at terminal Q of counter 849b causing flip flop 849c (74LS109) to go into the set state with terminal Q high on the next clock pulse from converter 470. This signal conditions multiplexers 859a and 859b to their other condition, that is, with the input connections from counting circuit 840 disabled and the address input connections from CPU 600 via SMI 860 enabled. The address inputs are designated in FIG. 8 as lines C.ADR00 through C.ADR07. No further counting by counters 849a and 849b will occur until they are enabled by a signal from gate 846 (340097), which is also connected to resistors 843a (10K) and 843b (2.2k). A low signal on lead C.TERM.CNT allows continued counting by counters 849, while a high signal disables gate 846 to terminate counting.

After the 256 eight bit digital signals have been stored in random access memory 830, the photosensitive array control circuit 500 returns to the charge condition as described above, and central processing unit 600 will begin timing the new charge cycle of photosensitive array 410.

Figure 12:
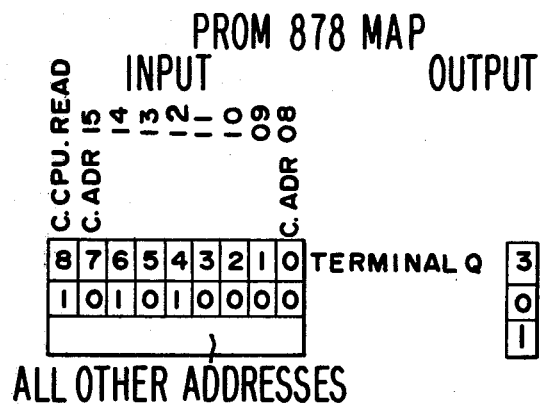
FIG. 12 is a map of the programming of programmed read only memory 878.

Central processing unit 600 can access the random access memory 830 to read out the data stored therein. This is accomplished in the following manner. The programming of central processing unit 600 will develop an address internally. This procedure is explained in the Fairchild Semiconductor F8 Circuit Data Book which is incorporated herein by reference. This address will be supplied to the buffer memory 800 through the lines designated ROMC0 through ROMC4 and DATA0 through DATA7. These signals are supplied to static memory interface 860 (Fairchild 3853). Enabling buffers 869a (Fairchild 340097) and 869b (Fairchild 340097) are utilized to filter out those signals on DATA lines intended for static memory interface 710 rather than 860. The high order eight bits of the signals appearing on lines C.ADR08 through C.ADR15 are supplied to a programmed read only memory 878 (93436, 93446). Programmed read only memory 878 is encoded to assert terminal Q3 low when specified addresses (for example, hexadecimal addresses 5000 to 50FF) are supplied to programmed read only memory 878. The memory map of memory 878 is shown in FIG. 12. The low at output terminal Q3 of programmed read only memory 878 is referred to as signal C.GATE BUFF* and enables buffers 889a (340097) and 889b (340097). The enabling of buffers 889a and 889b allows the data within random access memory 830 to be placed on the data bus lines designated DATA0 through DATA7. At the same time data bus control signal DBDR* is asserted as a low by gate 876 (340097).

I. Memory 700

Figure 7:
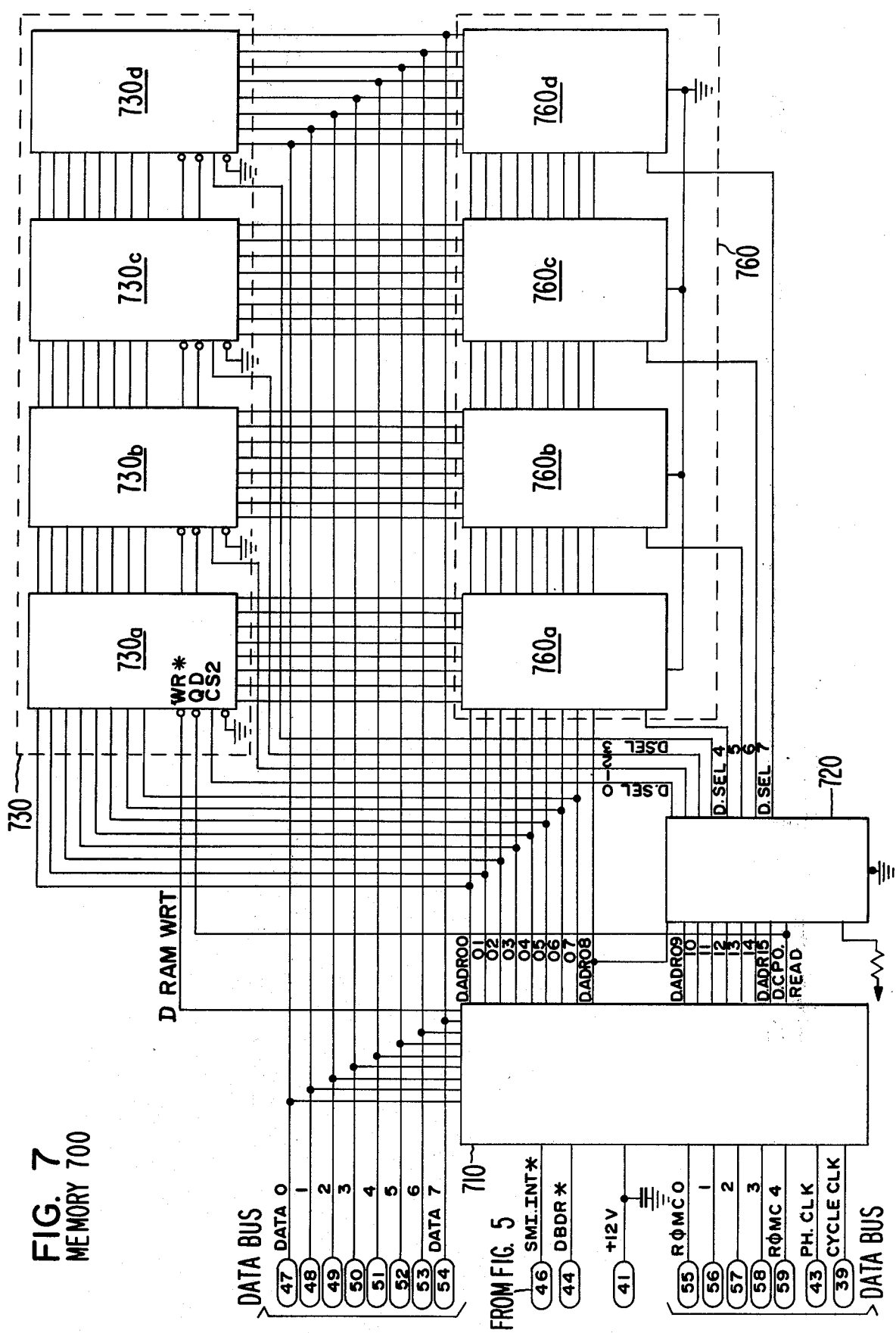
FIG. 7 is a schematic diagram of memory 700 of FIG. 1.
Figure 13:
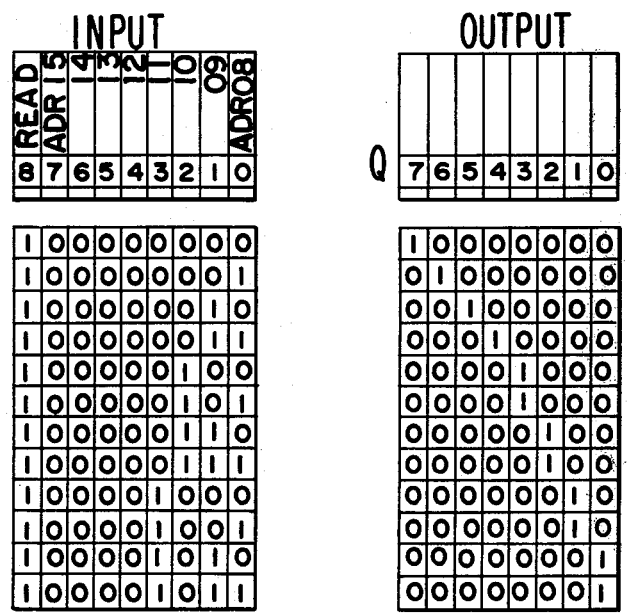
FIG. 13 is a map of the programming of the chip select decoder 720.

The circuitry of memory 700 depicted in FIG. 1 is shown in additional detail in FIG. 7. Memory 700 includes a static memory interface 710 (Fairchild 3853), a programmed read only memory 760 (four 512×8 Fairchild 93438/48), a random access memory 730 (four 256×8 Fairchild 3539), and a chip select decoder 720 (512×8 Fairchild 93448 PROM). The memory map of chip select decoder 720 is shown in FIG. 13. Additional memory can be added if required.

Programmed read only memory 760 contains instructions for central processing unit 600 and at least one table providing a conversion between the information generated by photosensitive array 410 and dimensional information. For example, if log diameters are being measured by the system, programmed read only memory 760 will contain a table relating the diameters of various size cylinders to the projected cords of those cylinders. Thus, for example, if n photosensitive elements of photosensitive array 410 have a pre-defined change in their digital value, programmed read only memory 760 will relate this change of n elements to a particular log diameter. If a single embodiment of this invention is installed a fixed distance from a region of space through which objects being measured will pass, a calibration must be performed to relate the projected image of these objects to their actual dimensions.

Random access memory 730 provides, in one embodiment, the necessary temporary storage for intermediate calculations by central processing unit 600, a set of 256 eight bit words representing dark current and a set of 256 eight bit binary code words indicative of the appearance of the region of space (without an object present) focused upon the photosensitive array 410. This reading will be generated and stored by scanner 100 during its initial few seconds of operation and at selected intervals thereafter. Depending upon the particular use to which scanner 100 is to be devoted, it may be necessary to not have an object in the view of the scanner 100 when it begins operation. Thus, in one embodiment, central processing unit 600 is programmed to utilize the field of view of the scanner 100 during the initial few moments of operation as a background reading for comparison with other readings to establish the dimensions of objects. Further, in operation, the central processing unit 600 may be programmed with a suitable algorithm to detect the edge of a solid object moving across its field of view. For example a significant change in k contiguous eight bit code words when compared to the corresponding code words from the stored background information will indicate the edge of an object, where k is a selected integer, such as 4 or 5. If the invention is so programmed, repeated background readings can be taken with any desired frequency between measurements of various objects. In other embodiments of this invention, for example, in the grading of lumber to insure a given lot contains only pieces of certain minimum dimensions it may be desirable to have an object in the field of view of the array 410 when the background signals are being generated and stored. In this fashion the dimensions of subsequently measured objects will appear as differentials from the initial object.

The dark current correction may be computed by central processing unit 600 and stored as a group of digital signals (eight bit binary code words) in random access memory 730 at any selected time. Updated data may be obtained with any desired frequency. This is accomplished by programming central processing unit 600 to perform the steps of the dark current correction at any desired interval. In one embodiment the correction is performed whenever scanner 100 is in a charge cycle. In another embodiment the correction is performed at selected intervals when scanner 100 is not measuring an object, that is, between edge detection sequences.

According to the first method central processing unit sets terminal $A_7$ of PSU 518a to logical one thereby blocking subsequent transfer of the accumulated charge packets from the photosensitive elements of array 410 to their corresponding shift registers. Central processing unit 600 then waits a suitable time for any existing charge accumulated in the analog shift registers to be "flushed," for example 128 microseconds in one embodiment. The period or interval over which charge will be allowed to accumulate within the photosensitive elements of array 410 is then computed and this period begun. At the start of this period terminal $A_3$ of PSU 518a is asserted low to thereby inhibit signals TTL$\phi$1 and TTL$\phi$2.

As soon as the selected interval elapses terminal $A_6$ of PSU 518a is asserted to place scanner 100 in a conversion cycle. Simultaneously signals TTL$\phi$1 and TTL$\phi$2 are enabled by resetting terminal $A_3$ of PSU 518a to a logical zero. The data from array 410 is then processed and stored and represents a measure of the integral of the dark current in the shift registers during the charge integration period.

Software utilized in conjunction with central processing unit 600 may be utilized to make initial calculations relating to the adequacy of the ambient light striking the photosensitive array 410. This is accomplished by selecting an integration time within which charge may accumulate within photosensitive array 410 and then converting the resulting analog signal to digital form and storing it, thereby to provide a measure of suitable integration time within which to allow light to cause charge to accumulate in the photosensitive array 410. For example, the initial integration time may be determined to be that time which results in an average five volt signal from analog to digital converter 470 for each of the photosensitive elements of photosensitive array 410. The resulting time interval expressed as a number of clock pulses is stored in random access memory 730. Typically, this integration time period will vary linearly with the amount of ambient light. Thus the total charge which accumulates in photosensitive array 410 will be proportional to the integration time selected by central processing unit 600 and the ambient lighting conditions present in the vicinity of photosensitive array 410. The set of 256 eight bit binary code words representing the charge packet accumulated in each light sensitive element of photosensitive array 410 will then be stored in memories 838a and 838b of buffer memory 800 in a manner as described above. CPU then transfers these eight bit code words to a selected one of static RAMS 730. The CPU then compares these code words to a previously defined set of code words to determine whether the charge accumulated over the selected integration time is greater than or less than desired, on the average. If the charge accumulated exceeds the desired charge by a given amount, this indicates that the ambient lighting is more intense than anticipated and the integration time is reduced until the accumulated charge packet in each light sensing element, on the average, comes to within the desired charge by a specified amount. On the other hand, if the average accumulated charge packet in each light sensing element is less than the desired average, the integration time is increased a selected amount until the average charge accumulated in each light sensing element is sufficiently close to the desired average value.

As a feature of this invention, the reference amplitude to which the accumulated charge packets in each light sensitive element of photosensitive array 410 is compared, can be varied over a selected range to add a greater degree of flexibility to the operation of the system. Thus if the ambient lighting is very weak and the maximum integration time of the scanner is not sufficient to bring the average amplitude of the charge packet accumulated in each light sensitive element of photosensitive array 410 to the reference amplitude, the reference amplitude can be lowered to a value which will bring the average value of the charge packet in each light sensing element to the reference value provided the ambient light is above a certain minimum value. Conversely, if the ambient light is greater than expected, and even the shortest integration time produces charge packets in the light sensitive elements of photosensitive array 410 which exceed the reference amplitude, the reference amplitude can be increased. The system produces output signals which indicate that the ambient light is too weak to allow the system to operate even with a lowered reference amplitude or too bright to allow the system to operate even with a raised reference amplitude.

As each object, for example, a log, passes out of the field of view of photosensitive array 410 the changing light pattern caused by the disappearance of its "trailing" edge is detected by an algorithm programmed into programmed read only memory 760 and utilized by central processing unit 600. Central processing unit 600 then regenerates the information utilized to select the integration time and stores this new integration time in random access memory 730. As soon as this information is stored, the central processing unit 600 is switched into an edge detection sequence and awaits the appearance of additional objects in the field of view of photosensitive array 410. By keying the programming of central processing unit 600 to the speed of the objects moving in front of photosensitive array 410, a sufficient amount of time may be allowed after detection of an edge of an object to allow photosensitive array 410 to sense the full dimensions of the object. For example, measurements of the diameter of a log may be made a selected period of time after detection of the edge to allow for the jagged edges of the cut ends of the log to pass before the photosensitive array 410. The relationship between changes in the output of the various photosensitive elements of photosensitive array 410 and the diameter or other selected dimension of the object being measured will be stored in programmed read only memory 760.

In a system similar to that previously discussed in conjunction with random access memory 830, the higher order address bits D.ADR09 through D.ADR15 are utilized by chip select decoder 720 to enable the appropriate portions of random access memory 730 or programmed read only memory 760 to read or write data supplied on lines DATA0 through DATA7. The signals from chip select decoder 720 are supplied to programmed read only memory 760 and random access memory 730 by lines designated D.SEL0 through D.SEL7. In other conditions, central processing unit 600 may write data into random access memory 730 by applying an enabling pulse to line D.RAM.WRT* which is supplied to terminal WR* of random access memory 730. The static memory interface 710 accepts as input signals the ROMC control signals from the data bus. In response to particular ROMC signals static memory interface 710 will accept data from data lines DATA0 through DATA7. As static memory interface 710 accepts data from the data bus, this data is translated into address signals to be output on the leads designated D.ADR of static memory interface 710.

Whenever either random access memory 730 or programmed read only memory 760 is properly addressed and the data from either memory is ready to be placed on the data bus, static memory interface 710 triggers signal DBDR* to inform the central processing unit 600 that the data is ready for transmission. The data is then placed on the data bus for utilization by the remainder of the system.

J. Display Circuit 900

Figure 9:
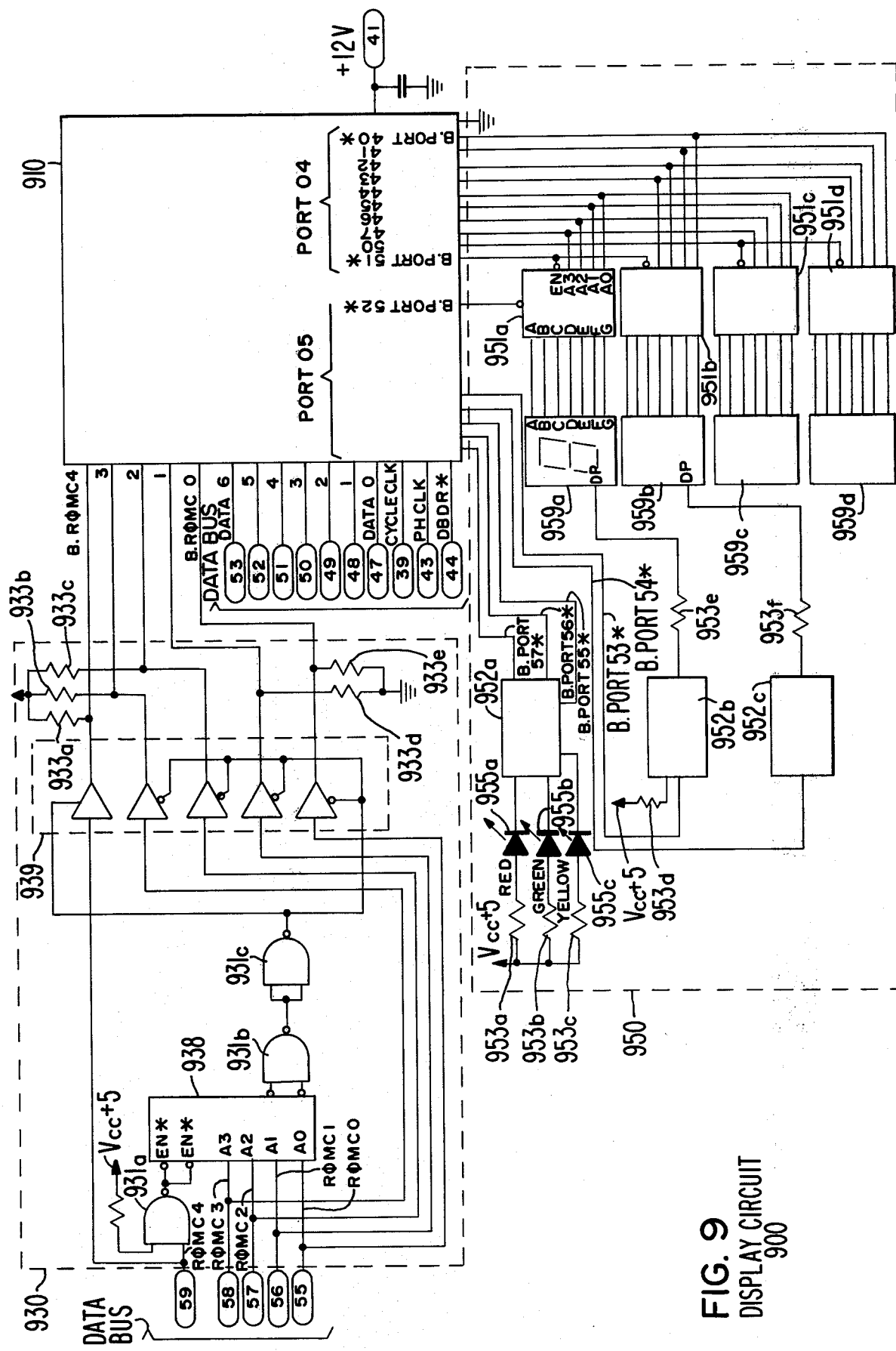
FIG. 9 is a schematic diagram of display circuit 900 of FIG. 1.

Display circuit 900 is shown in FIG. 9. Display circuit 900 includes a program storage unit 910 (Fairchild 3851), which is utilized solely as an output device. Because of this limited utilization of its capabilities, disabling circuit 930 prevents certain signals on lines ROMC0 through ROMC4 from being input to program storage unit 910. Disabling circuit 930 includes NAND gates 931a, 931b and 931c (each 74L00), 938 (93L11), 939 (340097) and resistors 933a through 933e (each 10K).

Light emitting diode display circuit 950 includes 7-segment displays 959a through 959d (each FND507), light emitting diodes 955a (FLV110), 955b (FLV360) and 955c (FLV410), 7-segment display decoder/-driver/latches 951a through 951d (each 9370), drivers 952a through 952c (each 8T28) and resistors 953a (120), 953b (120), 953c (120), 953d (10K), 953e (91), and 953f (91). Each of the 7-segment displays 959 is directly driven by a corresponding decoder 951 which has a built-in current limitation. Similarly, each light emitting diode 955 is directly driven by a driver 952 and has an associated current limiting resistor 953a, 953b, 953c.

After the central processing unit 600 processes data, it sends an output code on ROMC0 through ROMC4 to program storage unit 910. Data is then supplied to program storage unit 910 on lines DATA0 through DATA6. Program storage unit 910 accepts the data and drives a series of 7-segment displays 959a through 959d through port 04. At the same time, signals placed on lines B.PORT53 and B.PORT54 connected to port 05 control the location of the decimal point, if any. Drivers 952b and 952c are utilized to drive the appropriate decimal point terminal DP in the presentation of information on the 7-segment displays 959a and 959b. In one embodiment programmed to display log diameters in meters the decimal point is placed after the first digit whereas if inches are used the decimal point may be placed after two digits. Light emitting diodes 955a, 955b, and 955c, are status lights which are driven by driver 952a. Illumination of light emitting diode 955a informs the user of the system that the system is attempting to adjust itself to ambient lighting conditions and cannot be used at this time. Illumination of light emitting diode 955b indicates that the system may be operated, while illumination of light emitting diode 955c indicates marginal ambient lighting conditions, and therefore possibly inaccurate dimensional measurements.

In the above-described system, the word "light" is used to mean any radiation capable of causing charge to accumulate in a photosensitive element in array 410. The set of digital code words representing the background (either with or without an object present, as desired) is generated in response to either a manually actuated recalibration button which generates a signal received by an input port of CPU 600, or to a variety of other possible inputs to CPU 600, including periodic recalibration signals. Simultaneously with the recalibration signal, a signal (or signals) from marker sensors 271a, 271b and 272a, 272b, is (are) input to CPU 600 to indicate either the presence or absence of an object in the field of view of scanner 100' (or scanner 100). Similarly the CPU 600 can be programmed to periodically measure the average or representative amplitude of detected charge to determine if the integration time needs to be adjusted in response to changing light conditions. Appropriate adjustment of integration time is then made in accordance with the results of a comparison of the amplitude of the detected charge to a reference amplitude.

The data sheets for semiconductor components used in this invention are hereby incorporated into this specification by reference to the extent they have not heretofore been so incorporated.

What is claimed is:

1. Structure comprising:
   means for producing one measure of a field of view without an object present and for producing another measure of the field of view with an object present, said means for producing comprising:
   photosensitive array means for receiving light representing the field of view without an object present and for producing from said light one set of intermediate signals representative of said field of view without an object present, said one set of intermediate signals comprising said one measure, and for receiving light representing the field of view with an object present and for producing from said light another set of intermediate signals representing said field of view with said object present, said another set of intermediate signals comprising said another measure, and
   means for controlling said photosensitive array means to produce in sequence said one set of intermediate signals and said another set of intermediate signals; and
   means for processing said one measure and said another measure to produce an intermediate signal indicative of the change of the field of view between said one measure and said another measure, wherein said intermediate signal is also indicative of selected characteristics of said object.

2. Structure as in claim 1 wherein said means for producing comprises means for producing first said one measure of a field of view without an object present and for producing second said another measure of the field of view with an object present.

3. Structure as in claim 1 wherein said means for producing comprises means for producing first said another measure of the field of view with an object present and for producing second said one measure of a field of view without an object present.

4. Structure as in claim 1 wherein said photosensitive array means comprises:
a line of light sensitive elements for producing said one set of intermediate signals representative of the field of view without said object present and said another set of intermediate signals representative of said field of view with said object present, respectively; and
means for amplifying the signals produced by said line of light sensitive elements.

5. Structure as in claim 4 wherein said means for producing includes means for converting the one set and the another set of intermediate signals produced by said photosensitive array means to one set and another set of digital code words respectively.

6. Structure as in claim 5 including memory means comprising:
first means for storing the one set and the another set of digital code words from said means for converting; and
second means for storing said one set of digital code words representing said field of view without said object present, for storing said another set of digital code words representing said second field of view with said object present, and for storing difference signals representing the differences between said one set of digital code words and said another set of digital code words.

7. Structure as in claim 6 including:
means for processing said one set of digital code words and said another set of digital code words stored in said second means for storing to produce said set of difference signals representing the difference between said one set of digital code words and said another set of digital code words; and
means for processing said set of difference signals to detect differences between said one set and said another set of digital code words indicative of the presence or absence of an object in said field of view.

8. Structure as in claim 7 wherein said means for processing comprises:
means for deriving from said one set of digital code words and said another set of digital code words both an indication of the presence or absence of an object, and selected dimensions of an object; and
means for displaying selected ones of said dimensions of said object.

9. Structure as in claim 8 wherein said second means for storing includes a programmable read-only memory for controlling the operation of said means for processing.

10. Structure as in claim 9 wherein said second means for storing includes static memory interface means for interconnecting said programmable read-only memory and the other memory contained in said second means for storing to said means for processing.

11. Structure as in claim 10 including means for interconnecting said means for controlling said photosensitive array means, said memory means, and said means for processing thereby to allow data to be transmitted between each of said means in accordance with instructions from said programmable read-only-memory means and said means for controlling said photosensitive array means.

12. Structure as in claim 4 wherein said
means for controlling said photosensitive array means, comprises
means for clearing said photosensitive array means of signals generated prior to a selected time;
means for controlling the transfer of charge from the light sensing elements of said photosensitive array means to said means for amplifying; and
means for allowing said photosensitive array means to accumulate in each of said light sensitive elements an amount of charge proportional to the light incident upon said element.

13. Structure for measuring selected dimensions of an object and for detecting the presence of an object which comprises:
means for producing a first measure of the field of view without an object present and for producing a second measure of the field of view at a subsequent time with an object present;
means for comparing said first measure and said second measure to detect the presence of said object;
means for processing said first measure and said second measure to produce measures of selected dimensions of said object.

14. Structure as in claim 13 wherein said means for producing said first measure and said second measure comprises:
photosensitive array means capable of repetitively producing sequences of signals representing the field of view of a photosensitive array in said photosensitive array means; and
microprocessor means for containing a stored program of instructions and for carrying out selected operations on said first measure and said second measure in accordance with said stored program thereby to produce selected output signals representing said selected dimensions.

15. Structure as in claim 14 including display means for displaying the output signals produced by said microprocessor means.

* * * * *